United States Patent [19]

Billett et al.

[11] 4,330,245
[45] May 18, 1982

[54] APPARATUS FOR PRODUCING FROZEN CONFECTIONS

[75] Inventors: Ronald J. Billett, Sunnyvale, Calif.; David N. Anderson; William M. Easter, both of Lakeland, Fla.

[73] Assignee: FMC Corporation, Chicago, Ill.

[21] Appl. No.: 146,931

[22] Filed: May 5, 1980

[51] Int. Cl.$^3$ .............................................. A23G 9/26
[52] U.S. Cl. ................................ 425/126 S; 425/137
[58] Field of Search ............................ 425/126 S, 137

[56] References Cited

U.S. PATENT DOCUMENTS

| | | | |
|---|---|---|---|
| 2,884,875 | 5/1959 | Rasmusson | 425/126 S |
| 2,925,052 | 2/1960 | Glass | 425/126 S |
| 3,648,625 | 3/1972 | Glass | 425/126 S |
| 4,209,288 | 6/1980 | Tomey et al. | 425/126 S |

Primary Examiner—James R. Hall
Attorney, Agent, or Firm—Richard B. Megley; Louis J. Pizzanelli

[57] ABSTRACT

An apparatus for producing frozen confections of the type including sticks projecting from a block of frozen confection material including a plurality of detachable mold strips and a screw conveyor arrangement for indexing the mold strips through a closed rectangular path in a horizontal plane with the mold cups of the mold strips opening upwardly. The conveyor includes cradles to which the mold strips are individually and pivotally mounted, a rectangular arrangement of tracks for guiding the cradles through the rectangular path of travel, and several conveyor screws which are driven continuously for propelling the cradles along the tracks. The conveyor screws have screw grooves therein adapted to cause the cradles to dwell under a confection filler, a stick inserter, a confection extractor and mold cleaning apparatus. Between the extractor and mold cleaning apparatus a photodetector unit is mounted to scan the row of mold cups of each strip as it is laterally transferred from the extracting lane to the filling lane, and a turn-over device that is responsive to the photodetector unit is provided to invert only those mold strips found to contain confection material that was not removed by the extractor. The confection material is then dislodged from the inverted cup by an air jet, and the inverted mold strip is returned to its original orientation with the cups depending from the strip so that confection material may subsequently be deposited therein.

18 Claims, 23 Drawing Figures

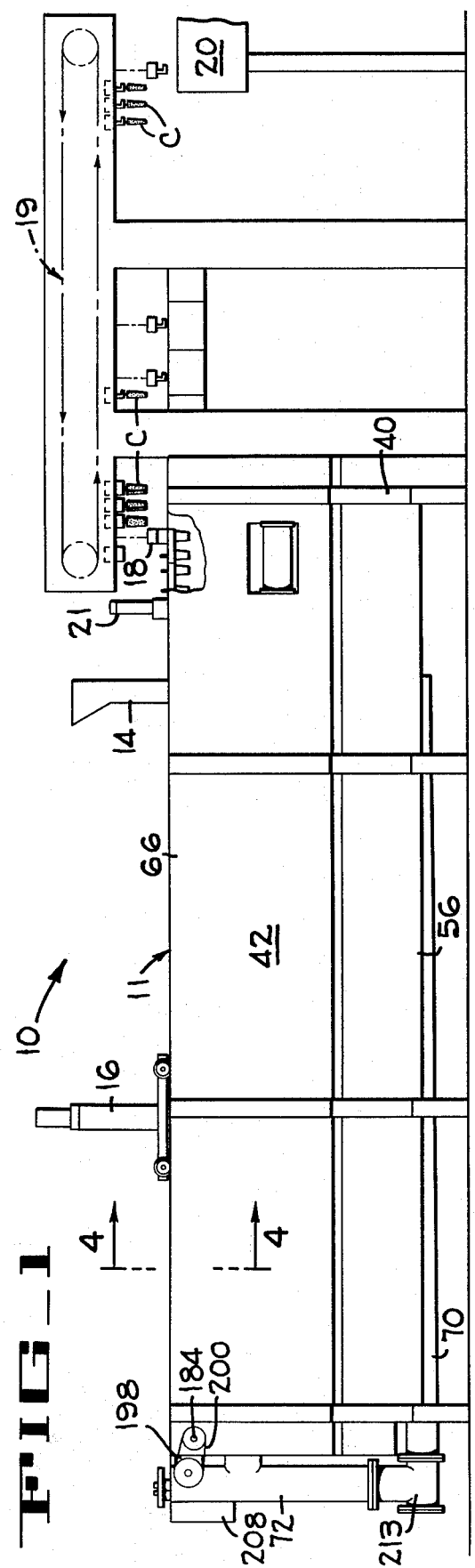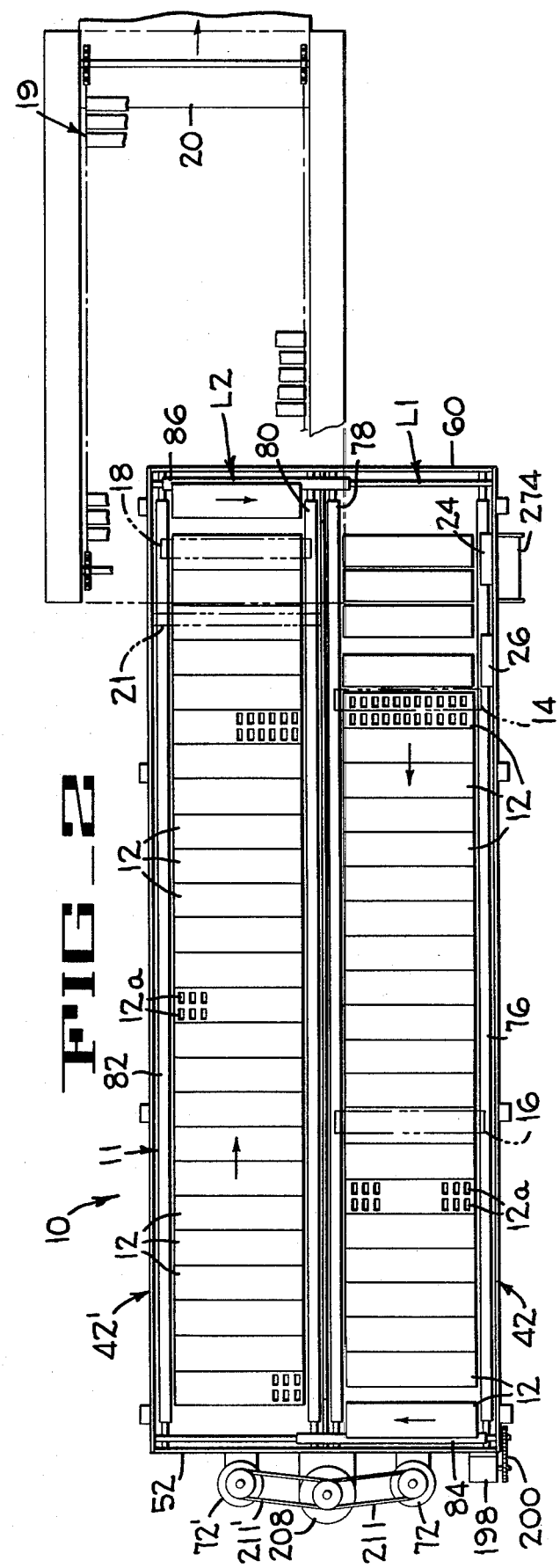

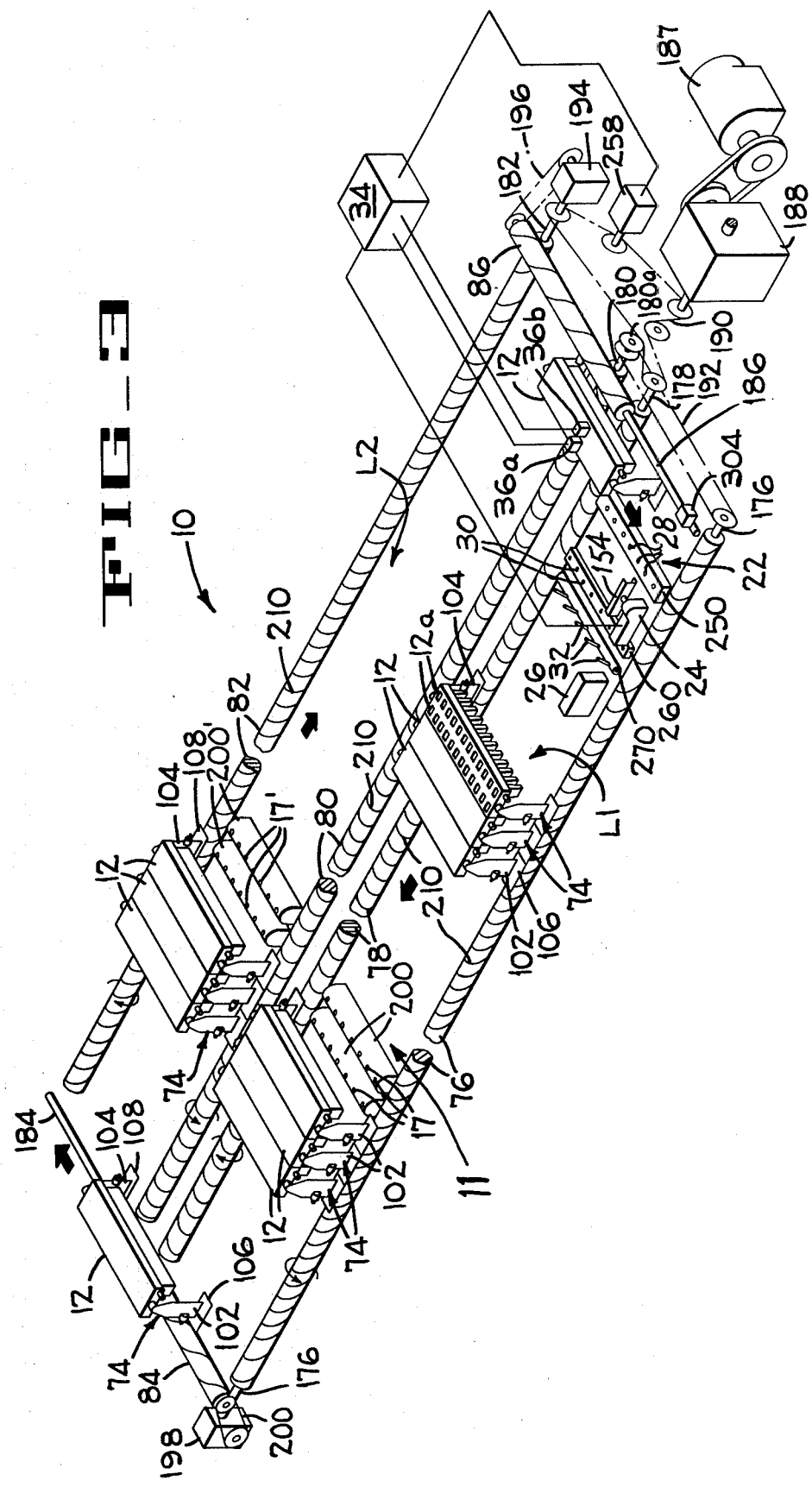

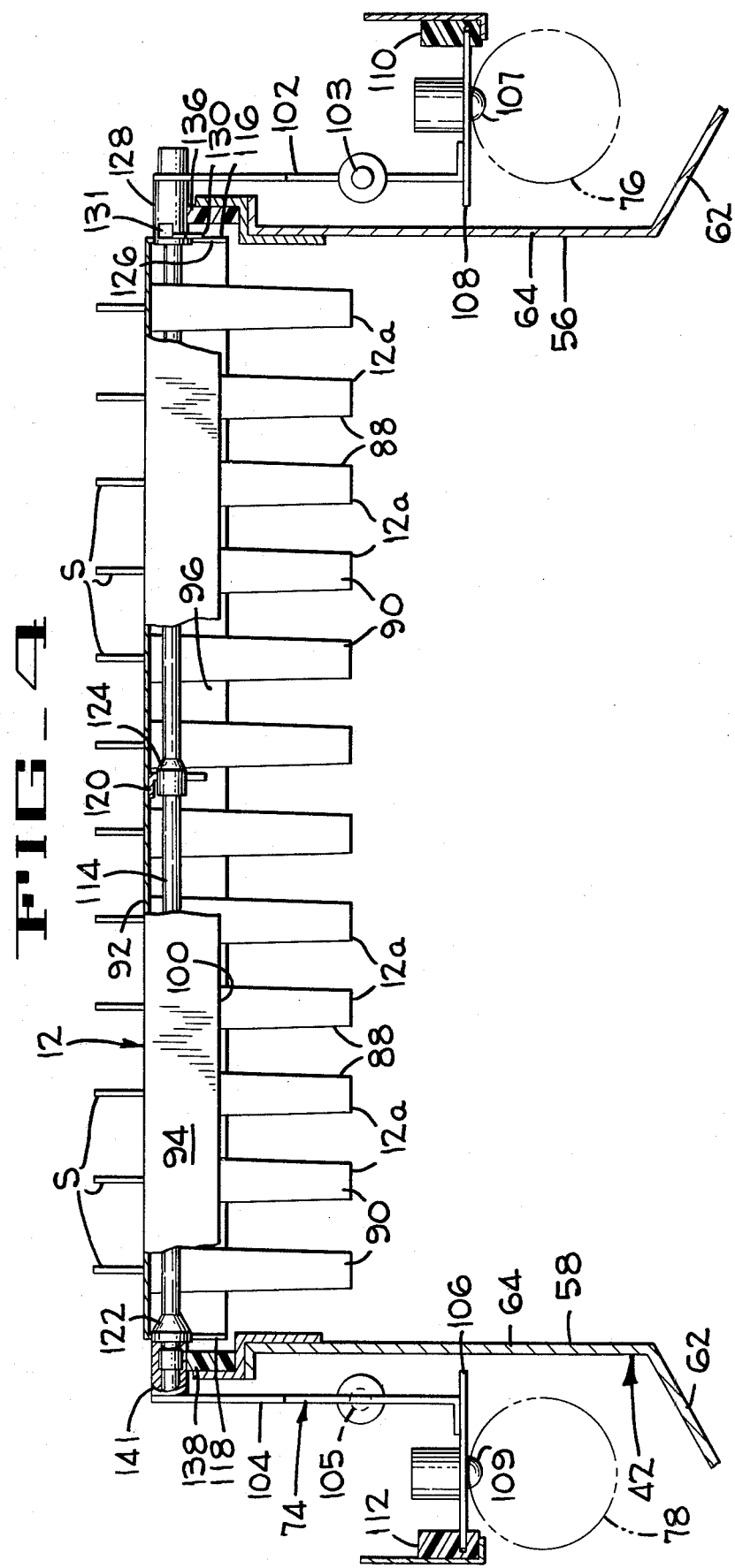

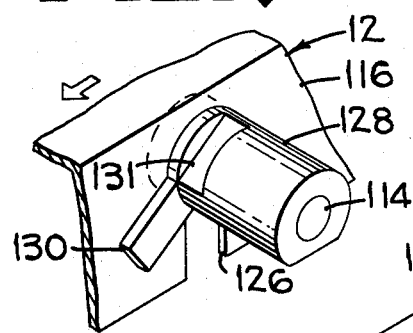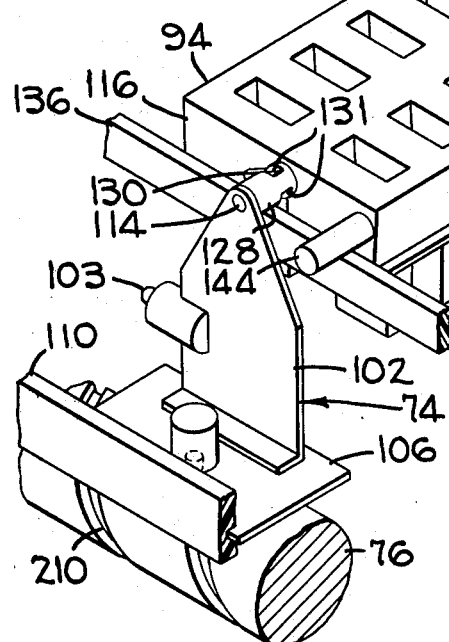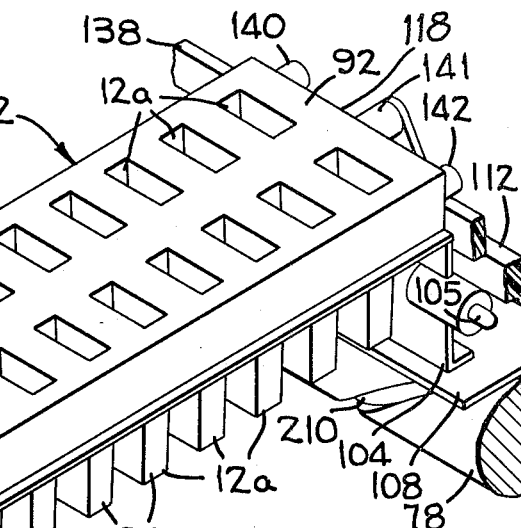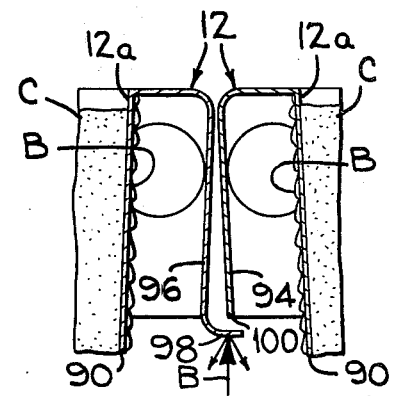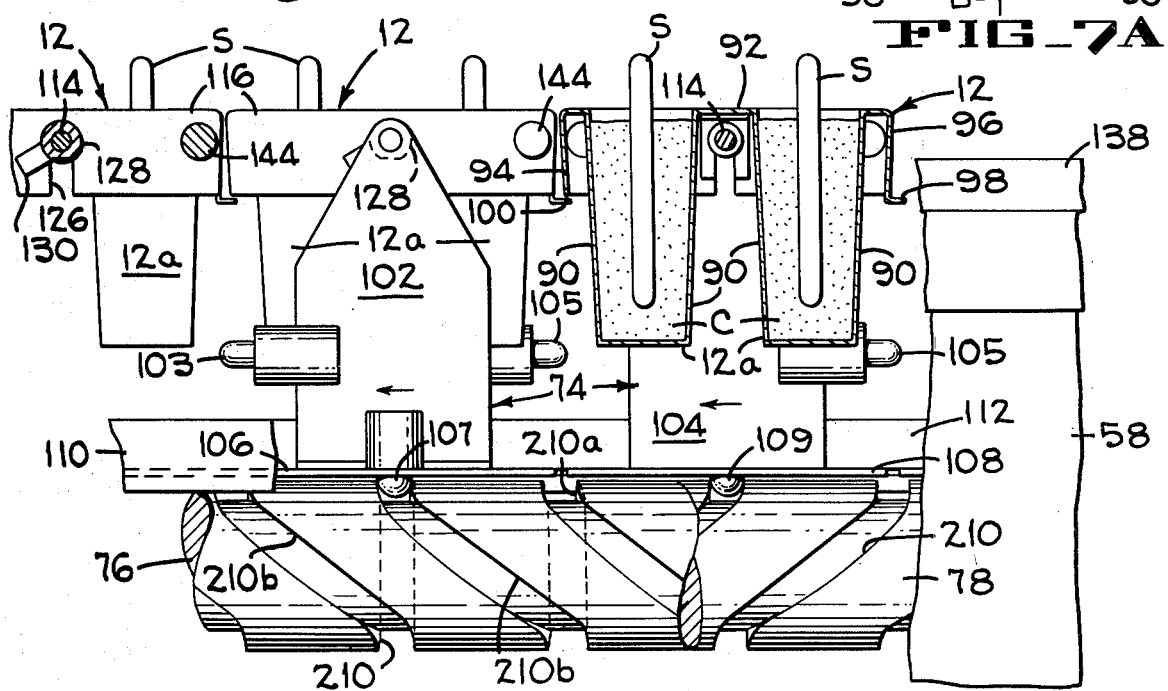

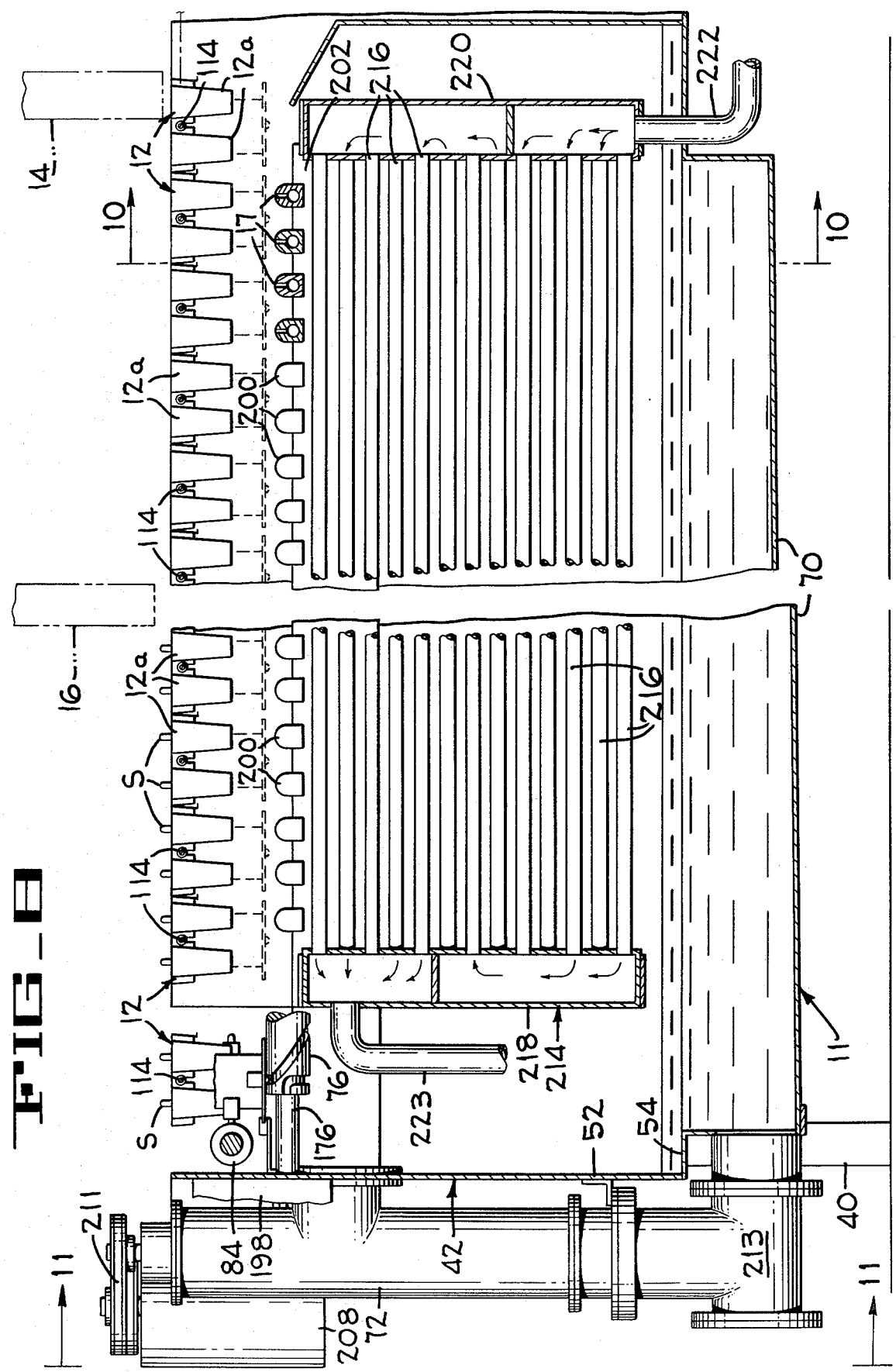

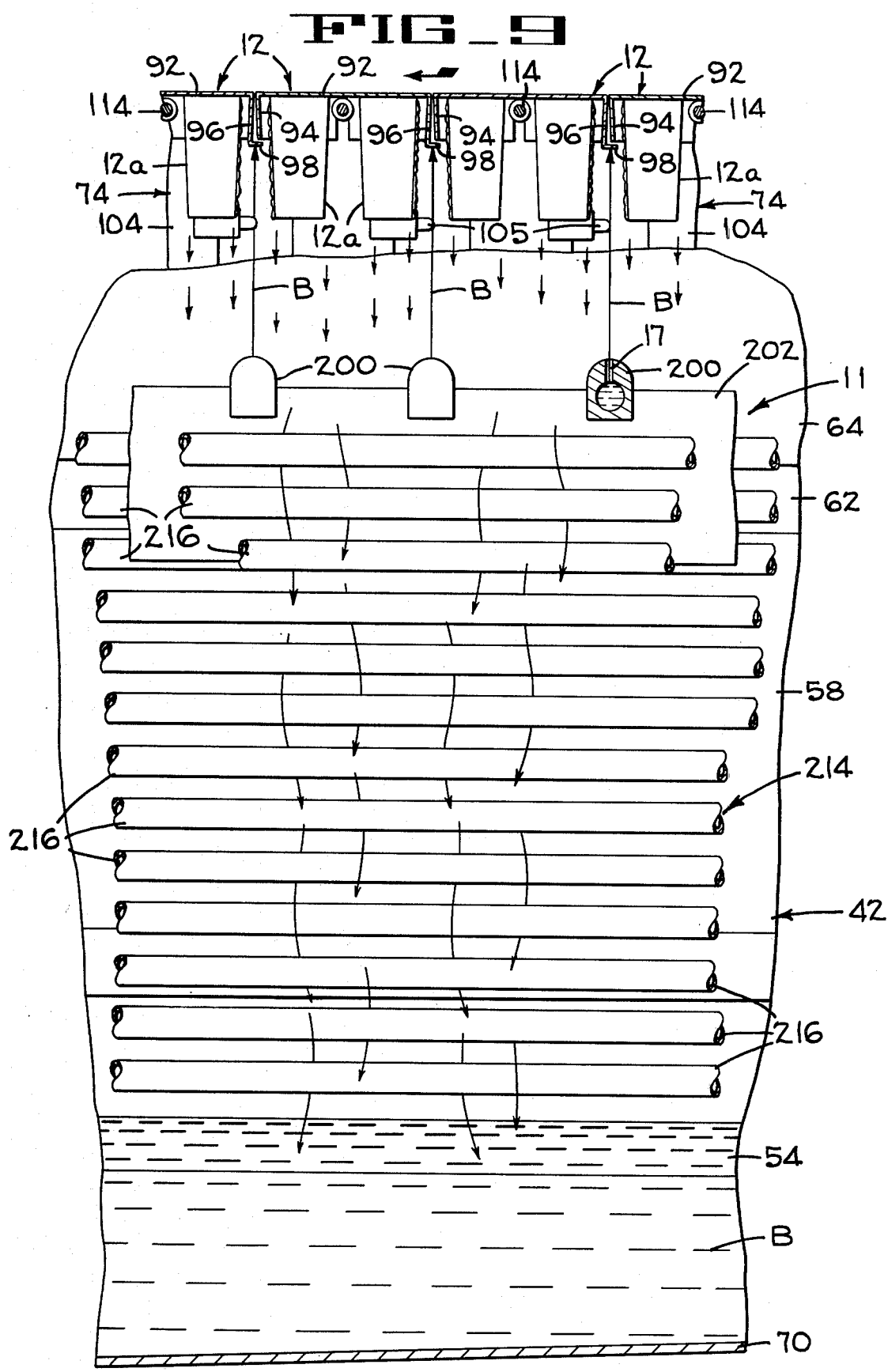

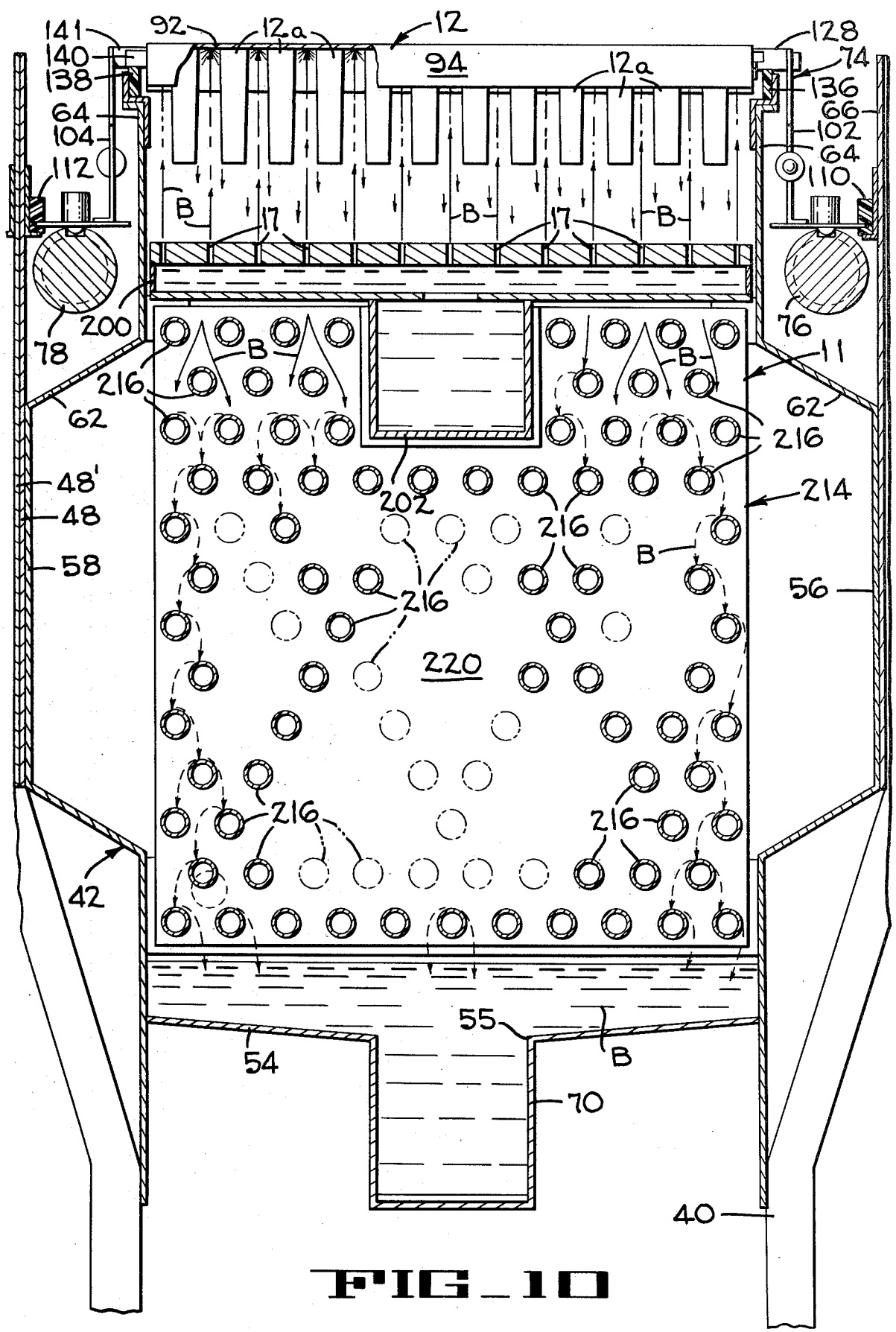
FIG_10

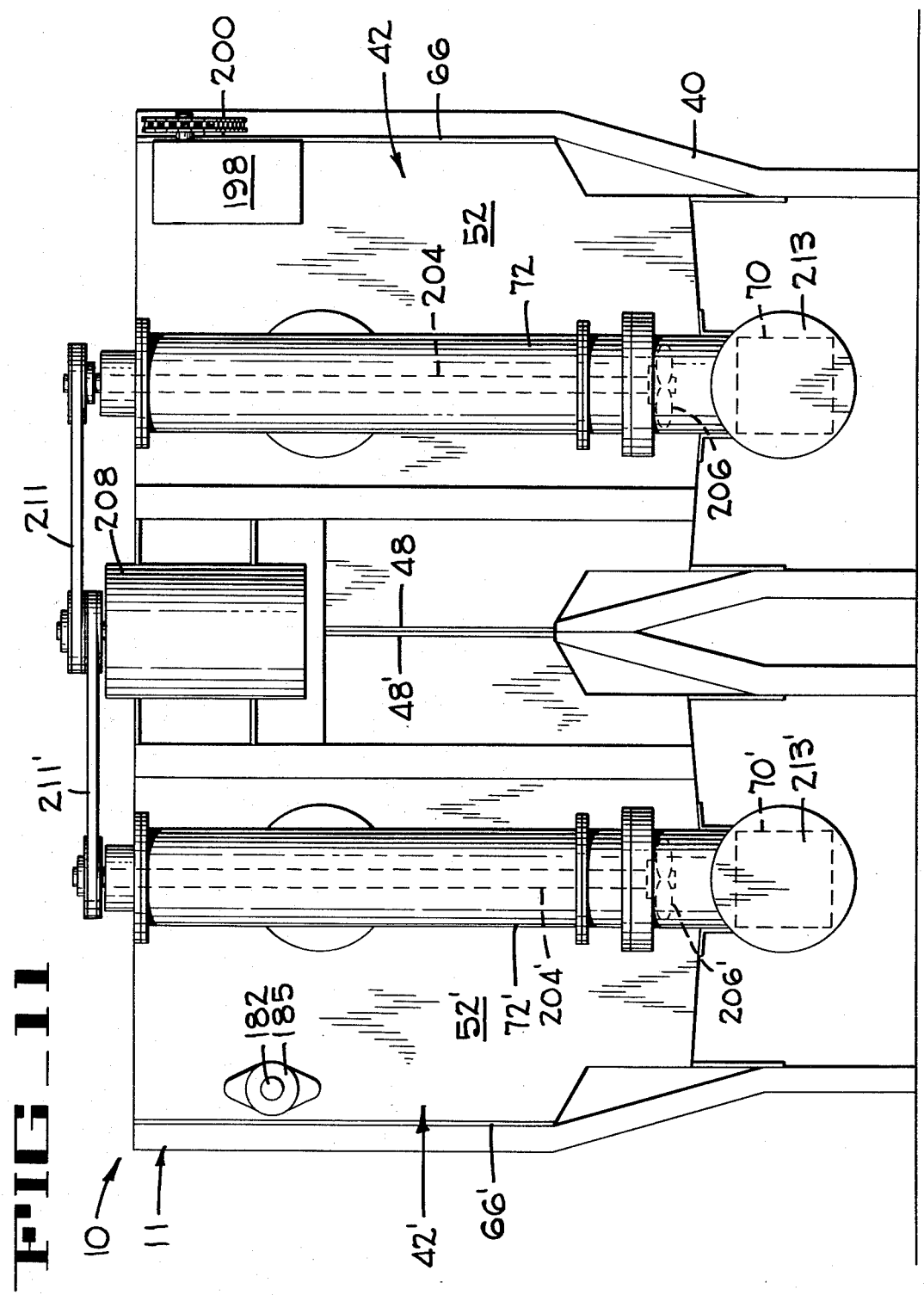

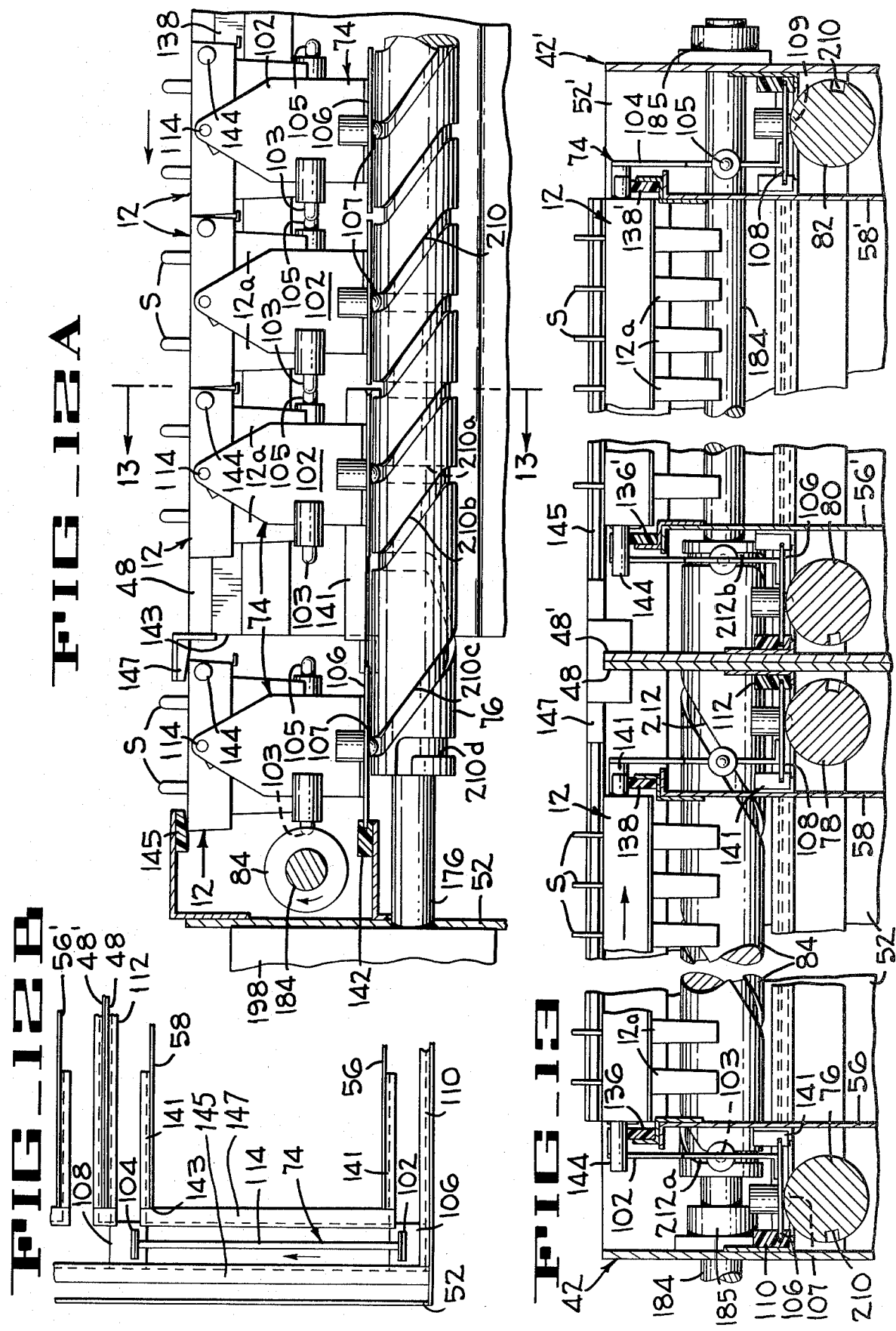

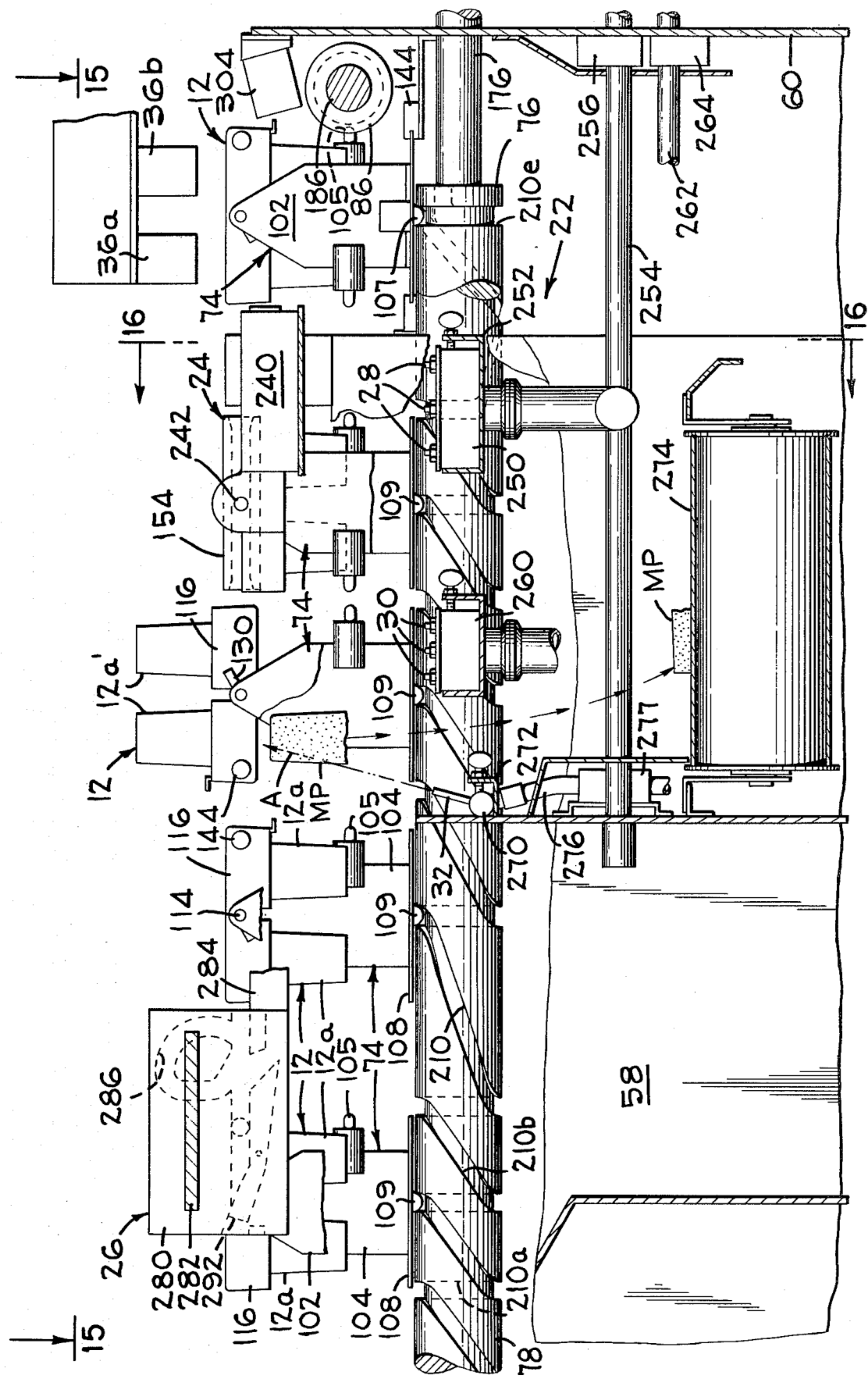

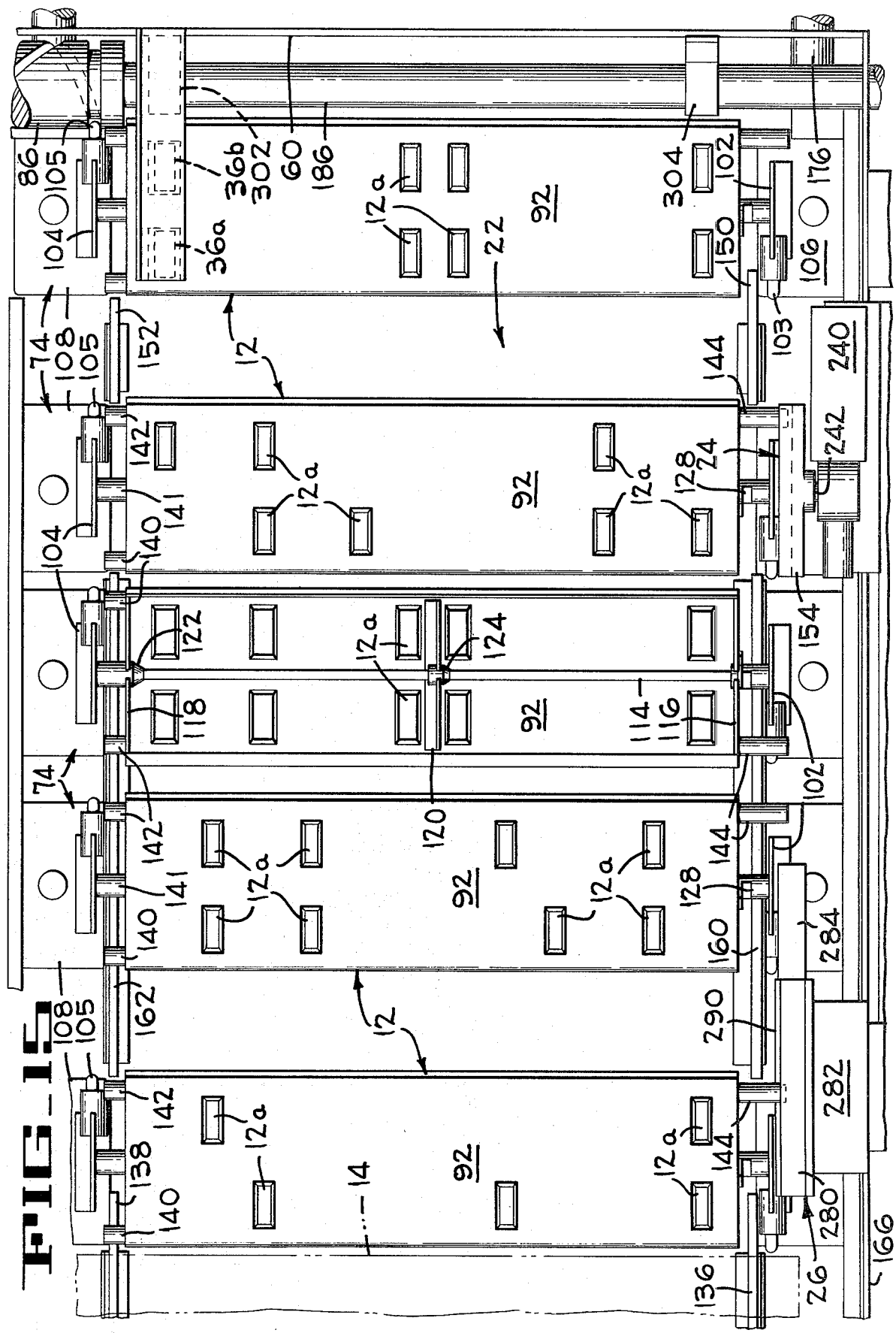

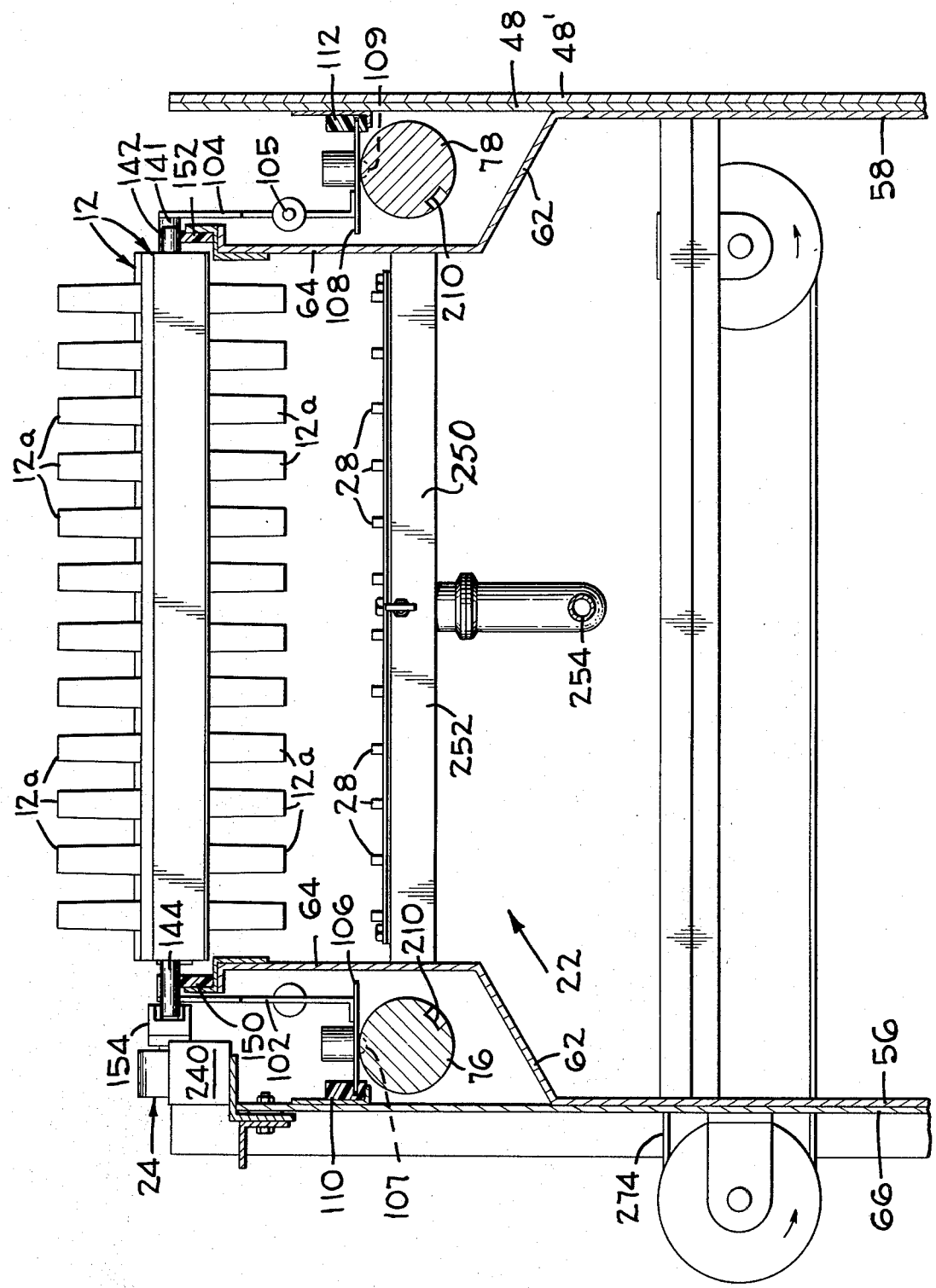

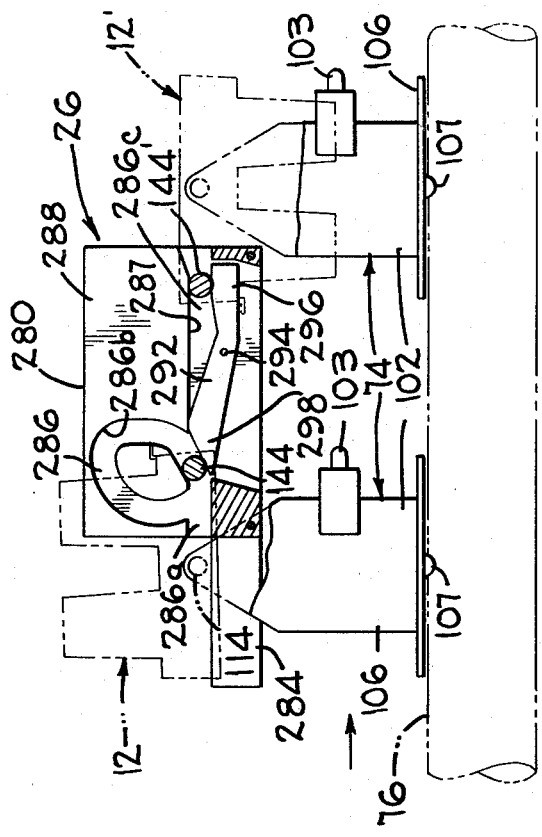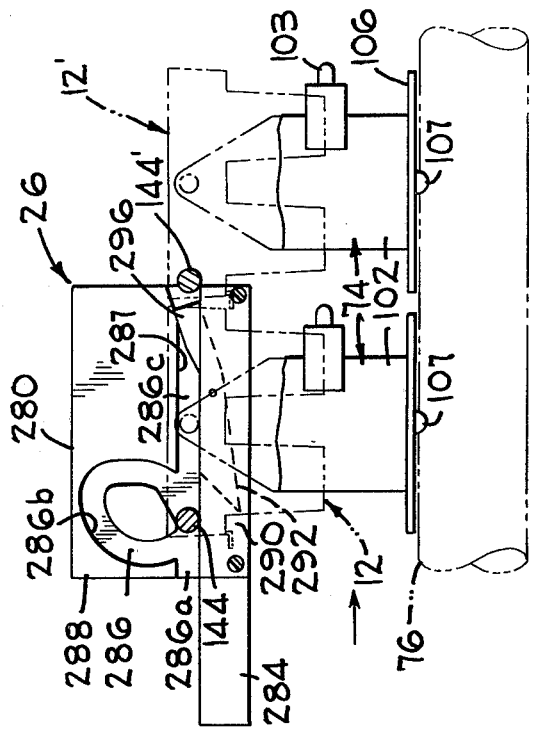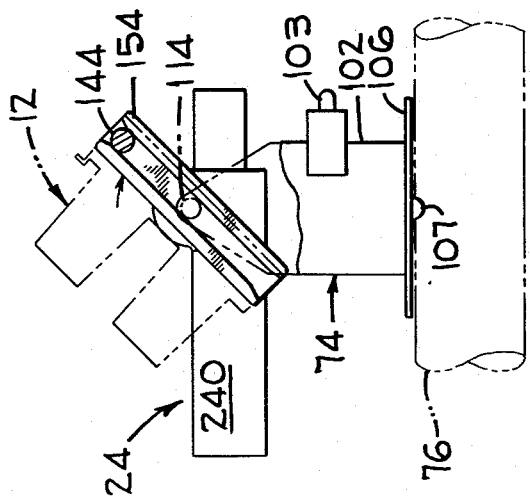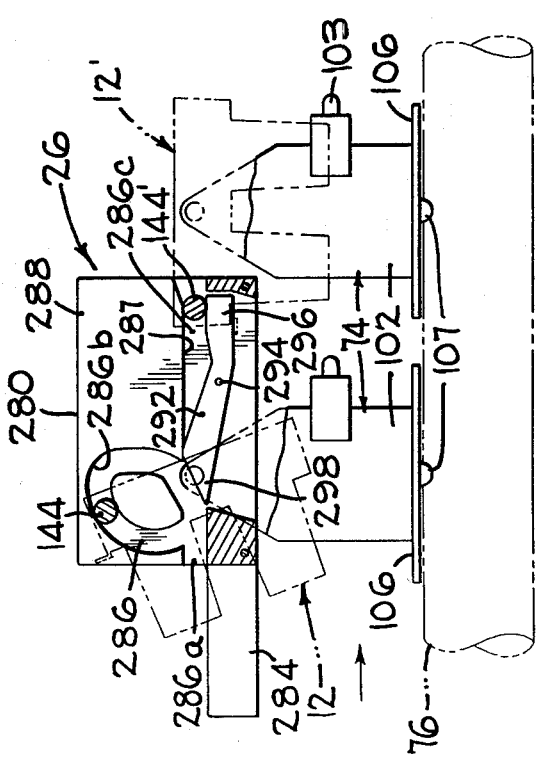

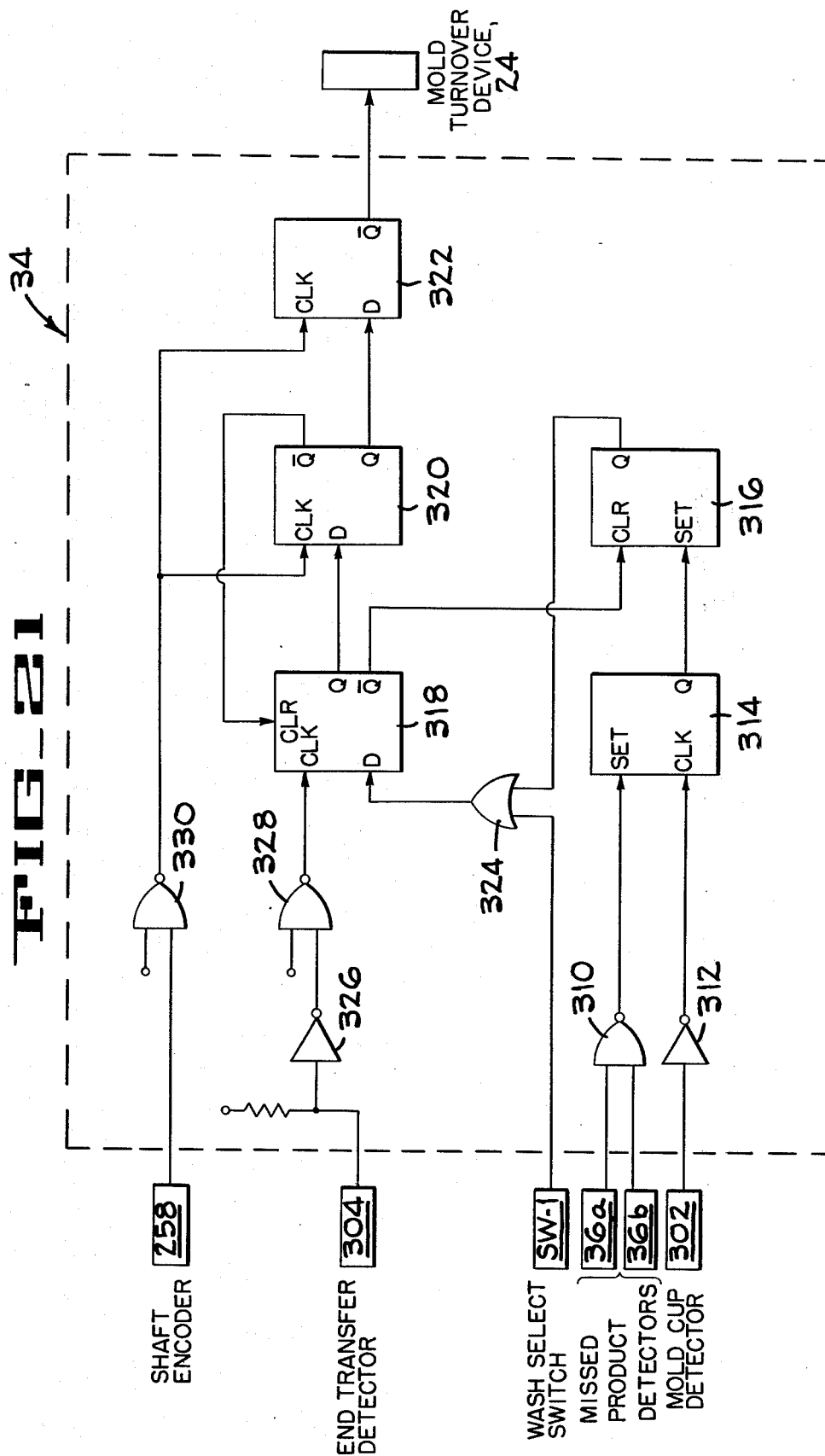

APPARATUS FOR PRODUCING FROZEN CONFECTIONS

BACKGROUND OF THE INVENTION

1. Field of the Invention

The present invention relates to apparatus for producing frozen confections of the type usually made from ice cream or water ice, and more particularly, the present invention concerns an apparatus for making such frozen confections in which the frozen portion of the confection is in the form of a block from which a stick or handle projects.

2. Description of the Prior Art

One type of apparatus for producing frozen stick confections includes a plurality of removable mold bars or strips and an endless chain conveyor for indexing the mold strips in closely spaced arrangement through a brine tank to freeze confection material that has been deposited in mold cups depending from and integrally formed in the mold strips. After the confection material is partially frozen, sticks are inserted therein to project upwardly from the mold strips. After the confection material is completely frozen, the mold strips are lifted out of the brine tank by the endless chain conveyor and are moved under an extractor. At the extractor station, the mold cups are heated to permit the frozen confections to be separated therefrom. The sticks projecting from the frozen confections are then grasped and pulled upwardly to simultaneously extract the frozen confections from a row of mold cups in a mold strip. Thereafter, the mold strips are conveyed under the brine tank with the mold cups facing downwardly. While the strips are so inverted, hot water is sprayed into the mold cups to clean any confection material from the mold cups that was not removed by the extractor. An example of such type of confection producing apparatus is shown in U.S. Pat. No. 3,031,978 to M. B. Rasmusson.

Another type of prior art frozen confection producing machine includes a relatively massive, flat annular mold member that includes a plurality of rows of mold cups which extend radially of the mold member. It should be noted that the annular mold member may be comprised of annular sectors rather than being unitary. This type of frozen confection producing apparatus further includes an annular brine tank through which the mold cups are conveyed by rotating the mold member about its axis. A confection filler is disposed at one end of the brine tank to successively deposit confection material into a radially extending row of mold cups, and an extractor device is provided for removing frozen confections from the cups after the row has been rotated through the brine tank. A stick inserter is mounted along the arcuate path between the filler and extractor. An example of this rotary type of frozen confection producing apparatus is described in U.S. Pat. No. 2,791,890 to O. G. Hoeyer.

A major problem associated with the linear type of frozen confection producing apparatus is that a substantial portion of the rows of mold cups are not in active use. That is to say, there are rows of mold cups that are empty and thus out of active use during that part of their path of travel that extends between the extractor station and the filler station. In the endless chain type of apparatus of the aforementioned Rasmusson patent, approximately 60% of the mold strips are positioned between the extractor and filler stations and therefore 60% of the mold strips are out of active use (with most of such mold strips being contained in the lower reach of the conveyor that extends below the brine tank). Even in the rotary apparatus, some rows of mold cups will be out of active use at any time since a portion of the circular path of travel of the mold cups occurs beneath the extraction device. Since the mold members are typically fabricated from stainless steel, the mold members comprise a major portion of the total cost of the confection producing apparatus, and thus any measure which would maximize the number of molds in active use will be seen to be desirable.

A problem particularly associated with the rotary frozen confection producing apparatus is that an operator is usually provided to inspect the mold cups downstream of the extraction station and to manually remove any substantial amount of confection material that may be left in the mold cups, particularly whole frozen confections. It will be understood that if the extractor fails to remove a frozen confection from a mold cup, then unless such missed confection or product is removed by the operator, the filler will deposit new confection material into such cup so that it overflows the cup. It is further noted that there is always a possibility that the stick inserter will fail to insert a stick; accordingly, the extractor will fail to remove the stickless confection due to such failure of the stick inserter. In view of such possibilities of extractor failure, an operator is routinely provided to oversee the operation of the rotary type of confection producing machine.

In contrast, the confection producing apparatus of the Rasmusson U.S. Pat. No. 3,031,978 eliminates the need for such an operator because all of the mold strips are automatically and invariably inverted and cleaned as they are returned from the extractor station to the filler station. Such cleaning is sufficient to remove any missed confection that is not extracted from a mold cup.

The automatic cleaning of all mold strips is, however, not always desirable. In the extraction of frozen confections from the mold cups, hot water is usually sprayed against the outside surface of the mold cups to melt the outer surface layer of the confection to permit the frozen confection to be extracted (as described in U.S. Pat. No. 3,695,895 to J. S. Brown). A small amount of confection material will thus be routinely left in the mold cups; unless the mold cups are inverted, such minor residual material will be combined with the next batches of confection material deposited in the cups. Such minor amount of molten material is economically significant when considered in the course of producing thousands of confections.

SUMMARY OF THE INVENTION

According to the present invention, an apparatus for freezing confections is provided which substantially reduces the number of mold members that are out of active use. The freezing apparatus of the present invention includes a plurality of separate mold members, each mold member including at least one row of mold cups depending therefrom. The apparatus further includes a conveyor for moving the mold members in a rectangular pattern, first in a single file along a relatively long lane during which confection material is deposited into the mold cups and during which sticks may be inserted into the confection material. At the end of such lane, hereinafter referred to as the filling lane, the mold members are moved one at a time laterally to an extraction lane wherein the molds are moved in the opposite direction in a single file that is parallel to and closely spaced from the filling lane. The confections are completely frozen in such second lane, and prior to the end of such lane, an extractor-conveyor is positioned to remove the frozen confections from the mold cups. The extractor-conveyor then transfers the frozen confections to a wrapper apparatus. After such extraction, the empty mold member is moved laterally from the extraction lane back to the starting position or upsteam end of the filling lane. With this rectangular conveyor arrangement, only one mold member is necessarily out of use between the extractor and the filler—the member that is being laterally transferred between the parallel filling and extraction lanes. Moreover, a minimum lapse of time occurs as the empty mold member moves from the extraction station to the filler station, thereby minimizing the possibility of any hygiene problems associated with the minor amounts of the confection material which may be left in the mold cups after extraction of the frozen confections. Also, due to the compactness of the overall rectangular arrangement of the mold members, a minimum amount of floor space is required for the confection producing apparatus.

According to another aspect of the present invention, the mold members are pivotally mounted upon cradles or carriers so they may be inverted thereon, and a mold cleaning system is provided between the extraction station and the filler station, preferably at the upstream end of the filling lane. At the cleaning station, either all mold members or only selected mold members are, as desired, inverted and cleaned. In the preferred embodiment, such mold cleaning system selectively cleans only those mold members that have been detected to have a substantial amount of confection material in any mold cup thereof. Such selective cleaning apparatus includes a detector for sensing whether a substantial amount of confection material (such as an entire missed confection product) is left in a mold cup of a mold member that is transferred from the extraction station and further includes a turnover device that is responsive to the detector for thereafter inverting such mold member. The cleaning apparatus further includes a device for spraying fluid, such as a high pressure air blast, into the mold cups to remove detected confection material from the inverted mold member. The cleaning system also includes a device for returning an inverted mold member to its original orientation with the mold cups facing upwardly before it arrives at the filler station.

The preferred selective cleaning system is thus advantageously adapted to permit a mold member that contains only minor residual amounts of confection material in the cups to remain in its normal upright orientation without being inverted so that such residual confection material may be re-utilized; on the other hand, the preferred cleaning system is adapted to invert a mold member to remove any confection material which occupies a substantial portion of a mold cup in the mold, such as would be the case when either the stick inserter or extractor malfunctions.

BRIEF DESCRIPTION OF THE DRAWINGS

FIG. 1 is a diagrammatic side elevation of the apparatus of the present invention for producing frozen confections.

FIG. 2 is a diagrammatic top plan of the apparatus of FIG. 1, partially broken away, with the positions of the filler, stick inserter, pre-extractor and extractor being shown in phantom outline.

FIG. 3 is an isometric diagrammatic view of the conveyor apparatus of the present invention.

FIG. 4 is an enlarged section taken generally on line 4—4 of FIG. 1 with the freezer nozzles being removed for the sake of clarity.

FIG. 5 is a fragmentary isometric view of a mold strip together with the conveyor carrier or cradle to which it is removably and pivotably attached.

FIG. 6 is an enlarged fragmentary diagrammatic side elevational view in partial section that illustrates several mold strips and mold cradles and the associated conveyor screws and cradle guide tracks.

FIG. 7A is an enlarged fragmentary sectional view illustrating the intermeshing end walls of adjacent mold strips.

FIG. 7B is an enlarged fragmentary isometric view that depicts the means for detachably connecting a mold strip upon a cradle.

FIG. 8 is a sectional view taken longitudinally through the filling lane of the frozen confection producing apparatus with a portion of the apparatus being broken away and removed and with the positions of the filler and stick inserter being shown in phantom outline.

FIG. 9 is an enlarged fragmentary side elevational view that illustrates the brine jet spray system for freezing the confection material deposited in the mold cups with the mold strips being shown moving between their dwell positions.

FIG. 10 is an enlarged section taken on line 10—10 of FIG. 8.

FIG. 11 is an end elevation taken in the direction of the arrows 11—11 of FIG. 8.

FIG. 12A is an enlarged sectional view that illustrates the separation of the mold strips at the end of the filling lane.

FIG. 12B is a fragmentary, diagrammatic plan view that illustrates the cradle guide tracks at the end of the filling lane.

FIG. 13 is a section taken on line 13—13 of FIG. 12 with a portion of the apparatus being broken away and removed.

FIG. 14 is an enlarged longitudinal sectional view that illustrates the mold cleaning system of the frozen confection producing apparatus.

FIG. 15 is a top plan of the cleaning area in the filling lane taken in the direction of the arrows 15—15 in FIG. 14.

FIG. 16 is a section taken on line 16—16 of FIG. 14.

FIG. 17 is a fragmentary side elevational view that depicts the operation of the mold turnover device of the mold cleaning system.

FIGS. 18–20 are fragmentary side elevational views which illustrate the sequential operation of the cam block assembly for returning the mold strips to their original orientations after they have been cleaned.

FIG. 21 is a schematic diagram showing the control circuit for selectively energizing the turnover device to invert a mold strip when an unextracted confection is detected in the mold strip.

DESCRIPTION OF THE PREFERRED EMBODIMENT

Referring now more particularly to FIGS. 1–3, an apparatus 10 for producing frozen confections C of the type including a bar or block of confection material having a stick S partially embedded therein (FIG. 6) is there shown and generally comprises a freezing apparatus 11 that includes a plurality of removable elongate mold strips 12 and a conveyor including several conveyor screws 76-86 (FIG. 3) for indexing the mold strips through a rectangular path of travel. The path of travel comprises relatively long, parallel, closely spaced filling and extraction lanes L1 and L2, respectively, and short lateral transfer legs extending between the ends of the filling and extraction lanes. In the filling lane L1, confection material is deposited by a filler 14 into the cups or compartments 12a of the mold strips, and the confection material is partially frozen within the cups by means of cold brine being upwardly directed in jets from freezer nozzles 17 (FIG. 3) against the bottoms of the mold strips. Sticks are inserted into the confection material in the mold cups by an inserter 16 after the confection material has been partially frozen. It should be noted that the position of the stick inserter is dependent on the freezing rate of the confection material. The rectangular path of travel of the mold strips includes a lateral transfer leg extending between the downstream end of the filling lane L1 and the upstream end of the extracting lane L2 (FIG. 2). The extracting lane L2 comprises the third leg of the rectangular path of travel of the mold strips, and in this lane the confections are completely frozen by means of jets of brine that are upwardly directed against the mold strips from nozzles 17'. After being completely frozen, the frozen confections are separated from the mold strips by a pre-extractor 21 and an extractor assembly 18 of an extractor-conveyor 19 that is mounted over the downstream end of the extracting lane L2. The extracted frozen confections are then transferred by the extractor-conveyor to a wrapper 20 (shown in part). The final leg of the rectangular path of travel is the end transfer leg extending at a right angle between the downstream end of the extraction lane L2 and the upstream end of the filling lane L1. The extractor assembly 18 is positioned closely adjacent the downstream end of the extraction lane (FIG. 2) so that only one mole strip is out of active use in such lane, i.e., the strip that is being transferred to the filling lane.

Preferred forms of the stick inserter 16 and the extractor-conveyor 19 are disclosed in the following co-owned patent applications: the inserter 16 is disclosed in a copending United States patent application that was concurrently filed herewith by B. M. Harper et al, such application being entitled, Inserting Sticks Into Confections, Ser. No. 146,935 filed May 5, 1980; the extractor-conveyor 19 is disclosed in the United States patent application that was concurrently filed herewith by S. D. Cross et al, this application being entitled, Stick Confection Extraction Apparatus, Ser. No. 146,844 filed May 5, 1980. The disclosures of these applications are incorporated herein by reference, and reference may be made to these applications for details of construction of the stick inserter and extractor-conveyor. It is further noted that the filler 14 is constructed generally in accordance with the disclosure of U.S. Pat. No. 2,850,051 to M. B. Rasmusson with, however, the filler spouts (not shown) thereof being adapted to the relatively reduced spacing between the mold cups 12a, as hereinafter described. The extractor-conveyor and stick inserter operate generally as described in the aforementioned U.S. Pat. No. 3,031,978 to Rasmusson. It is noted, however, that the stick inserter of the aforementioned Harper et al application is adapted to insert sticks at closer spacings and in different orientations relative to the direction of travel of the mold strips 12 and that the extractor-conveyor of the aforementioned Cross et al application accommodates the stick spacings and orientations.

The pre-extractor 21 is positioned upstream of the extractor-conveyor 19 for loosening the frozen confections from the mold cups 12a to enable the extractor assembly 18 to readily remove the confections without further heating of the mold cups 12a. The pre-extractor includes a defrost spray system (not shown) for directing hot water against the undersides of the mold cups to enable the confections to be separated and an extractor assembly (not shown) that includes spring-loaded grippers for individually biasing the confections to extract the confections from the mold cups momentarily and then drop them back into the mold cups. Such pre-extractor and the process of extraction is disclosed in a copending U.S. patent application that is filed by R. J. Billett et al and entitled Method of and Apparatus for Extracting Frozen Confections Ser. No. 146,814 file May 5, 1980.

Referring to FIGS. 3, 14 and 16, the freezing apparatus 11 includes a mold cleaning system 22 that is located at the upstream end of the filling lane L1 for selectively and automatically cleaning any relatively large amounts of confection material from the mold cups 12a, such as a whole frozen confection that may have been accidentally left in a cup after passing under the extractor 18 (such missed frozen confection being hereinafter referred to as missed product). The cleaning system 22, as shall be explained hereinafter in detail, does not normally invert and clean those mold strips which contain minor residual amounts of confection material such as are normally left in the mold cups after extraction of the confections (that is, the minor amount comprising the surface layer of the confection that is melted by the hot water sprays at the pre-extractor 21). The cleaning system includes a turnover device 24 for selectively pivoting a mold strip 12 that contains missed product through 180° into an inverted orientation so that the mold cups thereof face downwardly. A turn-back cam block assembly 26 is provided downstream in lane L1 for pivoting the previously inverted mold strips back to their original orientations prior to arriving at the filler 14. Prior to the time that a mold strip has been selectively inverted, all of the mold cups 12a are sprayed with hot water by a transverse row of defroster nozzles 28 (FIG. 14) to loosen any missed product within a mold cup. Thereafter, while a mold strip is inverted, the missed product MP (FIG. 14) is dislodged from the mold cup by one of several air jets emanating from a transverse row of air-jet nozzles 32 (FIGS. 3 and 14). As illustrated in FIG. 14, at the dwell position of the mold strips that is immediately upstream of the air-jet nozzles 32, a transverse row of wash nozzles 30 are provided for successively directing water into the cups of inverted mold strips when all of the strips are inverted, which, as shall be hereinafter described, may be done prior to any lengthy shutdown of the apparatus 10.

The cleanout system 22 includes a control circuit 34 (FIGS. 3 and 21) for selectively actuating the turnover device 24. The control circuit receives input signals from the two photodetector units 36a and 36b that are so located over the end transfer path between the lanes L2 and L1 that they respectively view the inner and outer rows of mold cups 12a of the mold strip 12 which is in transit in such end transfer path to the starting position of filling lane L1. As will be described hereinafter in detail, the control circuit thus receives signals from the photodetector units that indicate that a missed product is in any cup in the scanned rows and provides a signal to actuate the turnover device 24 to invert that (and only that) mold strip that contains a missed product. Such selective mold strip cleaning enables the freezing apparatus 11 to normally recirculate the mold strips in the horizontal plane of movement of the strips without inverting the strips, whereby minor residual amounts of confection material left in the mold cups after extraction may be reused. That is to say, the small residual amount of melted confection material that is normally left in a mold cup as a result of the heat used to facilitate separation of product from the mold (as described hereinbefore) is not automatically ejected or rinsed from the mold cup but is recombined at the filler 14 with the next confection material deposited into the cup. On the other hand, when it is desired to clean all mold cups, a switch SW1 (FIG. 21) may be set so that all of the mold strips are successively inverted by turnover device 24 and rinsed by hot water from the wash nozzles 30.

Having thus generally described the frozen confection producing apparatus 10 the construction of the freezing apparatus 11 will now be described in detail. Referring to FIGS. 1 to 8, 10 and 11, the freezing apparatus 10 will be seen to include a tubular frame 40 adapted to support two tanks 42 and 42' (FIG. 11) above the floor. It will be noted that the components of the tank 42' that are similar to the like components of tank 42 are given a prime designation. The two tanks are supported on the frame adjacent each other with walls 48 and 48' sandwiched between the tanks (FIGS. 10 and 11). Each tank includes end walls 52 and 60 (FIGS. 8 and 15), a bottom wall 54 (FIGS. 8 and 10), and side walls 56 and 58 (FIG. 10). As illustrated in FIG. 10, the tank side walls include inwardly tapered portions 62 and vertical upper end portions 64. An exterior wall 66 that extends the length of the apparatus is mounted between the tubular frame and the outermost tank side wall 56 (FIGS. 10 and 11). An opening 55 (FIG. 10) is formed longitudinally at the center of the bottom wall 54 of each tank, and a trough 70 is mounted to the bottom wall 54 below such opening to receive refrigerated brine and direct it back to a pump 72 as will be described hereinafter.

Referring to FIGS. 3-7 and 14-16, it will be seen that the mold strips 12 are pivotally and detachably received on carriers or cradles 74 adapted to transport the mold strips in a horizontal plane through the aforementioned rectangular path and over the tanks 42 and 42', with the mold strips being closely adjacent to each other and extending transversely of their direction of travel in the filling and extraction lanes L1 and L2. The cradles are intermittently driven, or indexed, over the tank 42 in the filling lane L1 by the pair of parallel transversely spaced conveyor or indexing screws 76 and 78 (FIG. 3), and the cradles are indexed through the lane L2 over the tank 42' by the pair of parallel indexing screws 80 and 82. As a cradle arrives at the downstream ends of the screws 76 and 78, it is brought into engagement against the end transfer conveyor screw 84, which screw is perpendicular to and above the ends of screws 76-82 (FIG. 12A). The screw 84 pushes a single cradle laterally from engagement with the conveyor screws 76, 78 into engagement with the conveyor screws 80, 82 (FIG. 3). At the downstream end of the extraction lane L2, the other end transfer conveyor screw 86 is provided at a right angle to the indexing screws 80, 82 to push the cradle that has been brought into engagement therewith laterally into engagement with the screws 76 and 78 so that it may be recirculated through the rectangular path of travel.

Before going on to describe the screw conveyor arrangement in more detail, the construction of the mold strips 12 and cradles 74 will be set forth. Referring to FIGS. 4-7, each mold strip has an identical construction and includes two rows of mold cups 12a. The illustrated mold cups have tapered rectangular cross-sectional configurations suitable for producing ice cream bars. The two rows of cups are formed in the mold strips so that the relatively wide side walls 88 of the cups oppose each other in a face-to-face relationship at uniform, relatively close intervals along the length of the mold strip (FIG. 5). Accordingly, the relatively narrow end walls 90 of the mold cups extend longitudinally of the mold strip. This mold cup arrangement minimizes the overall width of the freezing apparatus 11. The sticks S are normally inserted so that their flat faces extend in the direction of travel of the mold strips (FIG. 6).

Each mold strip 12 includes a flat rectangular top wall 92 from which the mold cups 12a depend, a forward or upstream side wall 94 (FIG. 7A) extending downwardly from the leading edge of the top wall, and a rearward or downstream side wall 96 extending downwardly from the trailing edge of the top wall. As shown in FIG. 7A, the downstream side wall 96 of each mold has a flange or lip 98 extending rearwardly from the lower end thereof, and the upstream side wall 94 of each mold terminates in a plain straight edge 100. It will be noticed the flange 98 underlies and overlaps the edge 100 when the molds are carried through the freezing sections of the apparatus over the freezer nozzles 17 and 17'. This overlapping flange configuration provides a baffle for preventing brine B (FIG. 9) from being sprayed upwardly between the molds, to thereby contaminate the confections C in the mold cups 12a.

The mold strips 12 are detachably mounted to the cradles 74 so that they may be conveniently removed and so that other mold strips for producing a different type of confection may be quickly installed on the cradles. Moreover, each mold strip is pivotally mounted on its cradle so that the cups 12a normally depend from the top wall 92 and so that it may be pivoted 180° in one rotative direction by the turnover device 24 and thereafter in the opposite direction by the turn-back cam 26. Referring to FIGS. 5 and 6, each cradle will be seen to include opposed leg plates 102 and 104 that have generally triangular upper ends. The lower ends of the leg plates 102 and 104 are fixed to feet or slide plates 106 and 108, respectively. The outer edges of the slide plates are received in grooves formed in a pair of plastic guide tracks 110 and 112 that are attached to the walls 66 and 48, respectively (FIG. 13). Tracks 110' and 112' are mounted to the walls 48' and 66' to guide the cradles above the conveyor screws 80 and 82. It may be noted that the guide tracks do not support the entire weight of the cradles; the cradles are also slidably supported in the lanes L1 and L2 on plastic support strips or rails 136 and 138 and 136' 138' (FIG. 13), respectively (as shall be described).

The cradles 74 further include rounded lugs 107 and 109 (FIG. 6) that vertically depend from the slide plates 106 and 108, respectively, and rounded lugs 103 and 105 (FIGS. 5, 6) that project horizontally in opposite directions from the leg plates 102 and 104, respectively. The lugs 107 and 109 of a cradle are respectively received in the grooves 210 of the indexing screws 76 and 78, respectively, when the cradle is in the filling lane L1, and such lugs are similarly received in the grooves of the indexing screws 80 and 82 as the cradle is propelled through the extraction lane L2. As shown in FIG. 4, the depending lugs are arranged so they project vertically downwardly over the centerline of the indexing screws. The lug 103 is, as shown in FIG. 12A, mounted to extend horizontally through the centerline of the end transfer screw 84 to enable the screw to push the cradle from the filling lane to the extraction lane. Similarly, the lug 105 (FIG. 14) of a cradle will be brought into engagement with the end transfer screw 86 when the cradle has been indexed into the downstream end or transfer position in the extraction lane L2.

As shown in FIGS. 12A, 12B and 13, the leading edges of the base plates 106 and 108 of a cradle 74 are received in a groove in an outer guide track 142 when the cradle is indexed to the downstream ends of the screws 76 and 78 and into engagement with the end transfer screw 84. A further guide track 144 (FIG. 14) is also mounted to the end wall 60 to extend horizontally to support the base plates 106, 108 as the associated mold strip is laterally transferred by the screw 86. As shown in FIGS. 12B and 13 the inner edges of the slide plates are received in inner tracks 141 that are mounted along the side walls 56 and 58 of the tank 42. Tracks similar to tracks 141 are mounted at the ends of the lanes L1 and L2 to guide the cradles in the end transfer legs.

Each cradle 74 further comprises a shaft 114 (FIG. 4) that is rigidly connected beween the leg plates 102 and 104. The mold strips 12 are rotatably received on the shafts 114. The means for detachably connecting a mold strip 12 to a cradle 74 is illustrated in FIGS. 4 and 7B. Each mold strip has end walls 116 and 118 and a central flange 120 (FIG. 4). The end wall 118 and the flange 120 have slots formed centrally therein with collars 122 and 124 being mounted on shaft 114 to be received in the rounded upper portions of the slots. The end wall 116, as shown in FIG. 7B, has a key hole slot 126 formed therein so that such end wall is adapted to be received on the inner end of a bushing 128 affixed upon the end of shaft 114. A lug 130 extends radially from the bushing at a position spaced from the innermost end of the bushing upon which the end wall 118 is received, the lug being affixed to the bushing to extend downwardly and forwardly in the direction of travel of the mold strip in the filling lane L1. Parallel grooves or notches 131 are formed in the circumferential face of the bushing just outside of the lug, such grooves being inclined from the horizontal and parallel to the lug. The straight lower part of the key hole slot 126 is parallel to the mold cups. Accordingly, to remove a mold strip from its cradle, the mold strip must be rotated clockwise until the straight part of the key hole slot 126 is aligned with the lug 130. Then, the mold strip may be pulled over the lug to align the end wall 116 within the grooves 131 so that the mold strip may be lifted from the cradle.

As illustrated in FIGS. 5, 10 and 13, the mold strips 12 and cradles 74 are slidably supported in the filling lane L1 upon plastic support rails 136 and 138 that are horizontally mounted in a parallel relationship to the upper end portions 64 of the side walls of the tank 42. Similarly, horizontal support rails 136' and 138' are mounted to the side walls of the tank 42' (FIG. 13) to support the cradles in the extraction lane L2. The support rails 136, 138 are so spaced above the guides 110, 112 that the weight of the cradles and mold strips is substantially borne by the support rails. It is noted that with the cradles and mold strips so supported, the drive pins 107, 109 remain elevated from the bottoms of the grooves in the indexing conveyor screws 76–82.

The mold strips 12 are prevented from tipping on the associated cradles 74 (except in the mold cleaning area) by means of dowel pins that extend outwardly of the strips and that ride on the support rails 136, 138. As shown in FIGS. 5 and 15, two dowel pins 140 and 142 project outwardly of the end wall 118 of each mold strip at the height of a bushing 141 mounted on the adjacent end of the cradle shaft 114 and the dowel pins 140, 142 and the bushing 141 (FIG. 4) ride on the inner rail 138 when moving through lane L1. The opposite end wall 116 of the mold strip has a relatively longer dowel pin 144 extending therefrom at the height of the bushing 128, and such housing and dowel pin 144 ride on the outer rail 136 in lane L1. In the filling lane L1, the rails 136 and 138 start at positions adjacent the turn-back cam 26 (FIG. 15) to support the mold strips as they are carried forwardly therefrom. The outer track 136 extends to near the end wall 52. As shown in FIGS. 12A and 12B, an opening 143 is formed in the inner side walls 58, 56' of each tank 42 and 42' and in the central walls 48 and 48' to permit the molds to be laterally transferred therethrough, with the inner rails 136' and 138 extending to the opening 143.

As a mold strip 12 is laterally transferred from lane L1 to lane L2, the strip is prevented from pivoting by overlying plastic bars 145 and 147 (FIG. 12A). Bar 145 is mounted to the end wall 52 to engage the leading edge of the top wall 92 of a mold strip, and the trailing end of the top wall of the mold strip is engaged by the relatively short bar 147 which is mounted at the ends of the central walls 48, 48' (FIGS. 12A and 13).

Within the mold cleaning area of the filling lane L1, several further pairs of support rails for preventing the mold strips 12 from pivoting on their support cradles are arranged in the horizontal plane of support rails 136 and 138. A first pair of short support rails 150 and 152 (FIGS. 15 and 16) are provided to support the mold strips until the long dowel pin 144 is received in the yoke or channel 154 of the turn-over device 24. As shown in FIG. 15, the length of channel 154 is equal to the width of a mold strip so that when the turn-over device 124 is not actuated, the mold strip is guided by the channel until the pins thereof are supported on a further pair of rails 160 and 162 which then guide the molds to the turn-back cam assembly 26. The mold strip is thereafter guided by the turn-back cam assembly through pin 144 until it is again supported on the rails 136 and 138.

The construction of the indexing conveyor screws 76–78 and the drive assembly for simultaneously and continuously driving such screws will now be set forth. The conveyor screws 76–78 include shafts 176–186 respectively, (FIGS. 3, 12A and 13) extending from their ends, and such screw shafts are received within and supported by bearings 185 (FIGS. 11, 12A and 15). The arrangement for synchronously and continuously rotating the conveyor screws (FIG. 3) includes a motor 187 connected through a right-angle speed reducer 188 to a chain 190. Chain 190 is entrained on sprockets connected to the shafts 178 and 182 to drive the screws 78 and 82 in the same direction. The chain 190 also engages the underside of a sprocket 180a at the end of the shaft 180 of the screw 80. A further chain 192 is entrained between a further sprocket on the shaft 180 and a sprocket at the end of the shaft 176. With this arrangement, the indexing conveyor screws 76 and 80 are continuously driven in the opposite direction from the conveyor screws 78 and 82 but at the same speed so that they jointly move the cradles along the filling lane L1 and extraction lane L2.

Power for driving the end transfer screw 86 is provided by a right-angle gear box 194 connected to the shaft 182 and a chain 196 entrained between a sprocket on the output shaft of the right-angle gear box 194 and the shaft 186 of the screw 86. Similarly, power for driving end transfer screw 84 is provided through a gear box 198 connected to the shaft 176 of the screw 76 and a chain 200 entrained between the output shaft of the gear box 198 and the shaft 184 of the transfer screw 84. The right-angle gear boxes 194, 198 and the sprockets on the gear boxes and shafts 186 and 184 are arranged to cause the end transfer screws 84 and 86 to rotate three times faster than the indexing screws 76–82 and to transfer the mold strips 12 in the end transfer legs in approximately two revolutions of the indexing screws 76–82. That is, the end transfer screws are adapted to transfer a cradle and mold strip in two indexing movements of the cradles in the lanes L1 and L2, as shall now be described.

The grooves 210 of indexing conveyor screws 76–82 are configured to drive the cradles 74 and attached mold strips 12 in an intermittent manner. Generally, the grooves have continuous configurations with dwell sections 210a formed therein (FIG. 6) to cause the mold strips to dwell at the filler 14, stick inserter 16, preextractor 21 and extractor assembly 18 and helical sections 210b (FIG. 6) between the dwell sections adapted to convey the mold strips with a controlled, smooth acceleration which prevents the confection material in the mold cups 12a from spilling over the tops of the mold cups. Also, the grooves in the indexing conveyor screws are adapted to maintain the mold strips in closely spaced relation when they are conveyed over the freezer nozzles 17 and 17' of the cooling system within the tanks 42, and 42', respectively. By keeping the mold strips in a precise closely spaced relationship, brine is prevented from being sprayed upwardly between the mold strips by the overlapping edge configuration shown in FIG. 7A, as previously explained. Also, the indexing conveyor screws 76 and 78 include relatively steep helical groove sections 210c (FIG. 12A) which are designed to separate a cradle and mold strip from the trailing mold strip just prior to reaching the lateral transfer at the end of lane L1. Similar grooves are provided on indexing conveyor screws 80 and 82 just prior to reaching the lateral transfer at the end of lane L2. Such separation of the end mold strip from the trailing mold strip in each lane allows time for the end mold strip to be laterally transferred without extending the dwell times in the operating lanes L1 and L2.

As shown in FIG. 6, the grooves 210 are formed in the screws 76 and 78 (and also in 80 and 82) to spiral in opposite rotative directions around the screws. The dwell groove portions 210a (FIG. 6) of the indexing conveyor screws are spaced uniformly along the length of the screws 76–82 in the vicinity of the freezer nozzles 17 and 17' as well as at the various stations (as explained previously). The distance between dwell grooves 210a is equal to the distance between the centerlines of mold cups 12a; in the present embodiment, since the mold cups are spaced by 3 inches, the dwell grooves are accordingly spaced by 3 inches to cause the cups to index forwardly 3 inches at a time. In such an arrangement, the mold strips are indexed forwardly every two seconds. Accordingly, since the mold strips have 12 cups in each row of cups thereof, 12 frozen confections are produced by the frozen confection apparatus 10 of the present invention every 2 seconds.

The configuration of the indexing conveyor screws 76–82 in the vicinity of the end transfer positions is shown in FIG. 12A. At the downstream ends of the indexing screws, groove portions 210c are formed to slope forwardly at a greater angle from the vertical to accelerate the cradle and mold strip in such position to thereby separate it from the trailing mold strip by the time the cradle and the strip arrive at the end transfer position. A dwell groove portion 210d is formed at the ends of the groove portions 210c, and much dwell portions 210d extend substantially around the perimeter of the screws to permit the cradle to be laterally transferred while engaged in such dwell groove portions. Also, relatively long dwell grooves 210e (FIG. 14) are formed at the upstream ends of the indexing screws 76–82 to allow the lugs 107, 109 to be received therein. In the present embodiment, the distance between the end dwell grooves 210d and the adjacent dwell grooves 210a is, for example, 6.5 inches to initially allow a 6.5 inch spacing between a mold strip in the end transfer position and the trailing mold strip (FIG. 12A). With one more revolution of the indexing screw, the strip in the end transfer leg will have advanced about halfway toward the other lane of the freezing apparatus, and the trailing mold strip will have advanced 3 inches. Thus, there will be a 0.5 inch spacing between the end transfer mold strip and the adjacent strip in the indexing cycle that follows the configuration shown in FIG. 12A.

The groove configuration of end transfer screws 84 and 86 is shown in FIG. 13 with respect to the screw 84. The grooves 212 have a uniform helical shape with dwell portions 212a and 212b at their ends. As previously stated, the end transfer screws are driven at 3 times the speed of the screws 76–82, and the grooves 212 are formed at a greater angle with the vertical than the grooves 210 in the indexing screws to rapidly accelerate the mold strips. It is noted that since the narrow dimensions of the mold cups 12a are in the direction of travel through the end transfer leg from lane L1 to lane L2, the increased acceleration exerted thereon will be less likely to cause confection material to spill out of the cups. It is further noted that the tendency for the confection material to spill depends on the viscosity of the material, which, in turn, depends on its freezing rate. For confections made from water-ice, the confection material in the mold cups is still quite flowable at the end of the filling lane, but spilling is avoided as a result of the transverse orientation of the cups in the lateral transfer leg.

The design of the indexing conveyor screws 76 and 78 in the vicinity of the cleaning area is illustrated in FIG. 14. The screws in such area are designed to rapidly transfer each cradle 74 and mold strip 12 from the end transfer position forward through a relatively large distance to a dwell position directly above the defroster nozzles 28. Thereafter, the cradle and mold strip are indexed forwardly and are caused to dwell in a position so that the mold may be inverted by the turn-over device 24. Thereafter, the mold strip and cradle are indexed forward so that the leading row of mold cups 12a of the mold are situated directly above the wash nozzles 30, which nozzles may be operated to wash the mold cups. Thereafter, the cradle and mold strip is indexed so that the leading row of mold cups is positioned relative to the air-jet nozzles 32 so that any missed product may be removed from the first row of mold cups in the inverted mold strip. Thereafter, the indexing screws are shaped to index the inverted mold strip forward and to dwell while the trailing row of cups is subjected to the air jets. Thereafter, the cradle and mold strip is indexed forwardly and is caused to dwell just upstream from the turn-back cam assembly 26. Finally, the mold strip is driven through the cam block assembly 26 through a relatively large distance to reinvert those mold strips that were inverted by the turn-over device 24, thereby assuring that all mold cups open upwardly. Thereafter, the screws 76, 78 are shaped to index a mold forwardly through three dwell positions to a position underlying the nozzles of the filler 14.

A brief description of the jet freezing system will now be set forth. It is noted that the jet freezing system is the subject of a patent application that is filed concurrently herewith and is entitled, Freezing Apparatus For Freezing Confection Material, such patent application being filed by R. J. Billett et al. Ser. No. 146 932 filed May 5, 1980. Within both tanks 42 and 42', the freezer nozzles 17 and 17' comprise bores formed in transversely extending nozzle manifold bars 200 that are affixed to a square header tube 202 extending longitudinally of the tank. As shown in FIG. 10, the nozzle bores 17 are formed in each manifold bar at uniform intervals so that the jets of brine B are directed upwardly therefrom midway between the mold cups 12 and against the flat bottom surfaces of the top wall 92 of the mold strip that are between the wider side walls 88 of the mold cups. Since brine at freezing temperatures is relatively viscous, the brine flows smoothly down the outer surfaces of the cups to absorb heat from the mold cups at a high rate of heat transfer. The manifold bars 200 are positioned on the header tube 202 at uniform intervals adapted to cause the jets of brine B to impact the mold strips between mold cups in a single row thereof when the cradles and mold strips are in their dwell positions (FIG. 8). That is to say, the manifold bars 200 are positioned at uniform intervals, and the indexing conveyor screws 76-82 are arranged to cause the mold strips to dwell with the centerlines of the cups situated directly over the spray bars so that the jets of brine B impinge perpendicularly against the upper wall of the mold strip exactly between the mold cups. It is noted that due to the edge configuration of the mold strips, a seal is formed between the mold strips which prevents brine from being injected upwardly between the mold strips as the mold strips are indexed as shown in FIG. 9. Also, the indexing conveyor screws are adapted to keep the mold strips at the same close spacings as they are indexed over the brine jets to avoid any possibility of brine contamination. Moreover, the screw conveyor arrangement maintains such mold strip spacing even after continued operation of the apparatus.

Cold brine is pumped into the header tube 202 by the pump 72 (or pump 72' in the tank 42'). As shown in FIGS. 8 and 11, the brine pump is mounted vertically to the end wall 52 and has a central shaft 204 having an impeller 206 (dotted outline) at the lower end thereof disposed below the surface level of the brine. Both brine pumps 72 and 72' are driven by a single motor 208 that is mounted between the pumps, with a drive belt 211 extending between the motor and the pump 72 and another drive belt 211' being connected to the pump 72'.

Brine flowing from the mold strips is eventually collected in the bottom of the respective tank 42, 42' and flows through the channel 70, 70' thereof into an elbow 213, 213' that is connected between the channel 70, 70' and the pump 72, 72' (FIG. 11). Positioned within each tank below the mold strips 12 and the manifold bars 200 is a tubular heat exchanger assembly 214 (FIGS. 8-10). As depicted by the arrows in FIGS. 9 and 10, brine which has flowed down the mold cups 12a trickles over the heat exchanger tubes 216, whereby the brine is cooled to a suitable low temperature. The cold brine is then collected, circulated through the trough 70, 70' and pumped by the pump 72, 72' back into the associated header tube 202. Each tubular heat exchanger assembly 214 consists of a plurality of straight metal tubes 216 mounted in parallel between rectangular header boxes 218 and 220 (FIG. 8) that are mounted between the side walls of the associated tank. As described in the last mentioned copending patent application of R. J. Billett et al., Ser. No. 146,932, filed May 5, 1980, a heat exchange medium such as liquid ammonia is pumped through an inlet conduit 222 into the upstream header box 220, and gaseous ammonia is withdrawn from the downstream header box 214 through a conduit 223. Preferably, the conduits 222, 223 are connected to the refrigeration system of the facility in which the frozen confection producing apparatus 10 is installed.

It is noted that the confection freezing apparatus 11 generally includes insulation material applied to the outside walls of the brine tanks 42, 42'. However, for purposes of clarity, such insulation is not shown in the drawings.

The turn-over device 24 comprises a pneumatic rotary actuator 240 (FIGS. 14-17) that is mounted at the top of the exterior side wall 66. The rotary actuator includes a shaft 242 (FIG. 14) that is aligned with the shaft 114 of a mold strip 12 to be inverted (FIGS. 15 and 17) when such mold strip dwells in the position of the actuator. The channel 154 of the turnover device is mounted upon the shaft 242 and is initially horizontally disposed so that the dowel pin 144 of the mold strip will slide from the end of the support rail 150 into the channel (FIG. 15). The actuator 240 is adapted to rotate the channel 154 through 180° so that upon the next index movement forward, pin 144 will slide from the channel onto the support rail 160. It will be noted (FIG. 17) that since dowel pin 144 is offset from the center of the mold strip, rotation of channel 154 results in 180° rotation of the mold strip. The actuator 240 includes an electric solenoid which, when energized, causes the actuator to rotate the channel 180° and to hold the channel arm in such position until the solenoid valve is de-actuated.

As shown in FIGS. 14 and 16, thge defroster sprayer nozzles 28 are incorporated in a defroster manifold 250 which extends transversely of the filling lane L1 at the dwell position between the end transfer position and the turn-over position. The defroster manifold 250 is supported at such position by a bracket 252 (FIG. 14) mounted between the side walls of the brine tank 42. Defroster nozzles 28 are arranged in three rows at uniform spacings so that the nozzles are located directly below the mold cups 12a. Hot water is supplied to the manifold through a conduit 254 that is connected to a pump (not shown), and a solenoid operated valve 256 is connected in the conduit 254. The valve 256 is operated from a control circuit (not shown) that, in turn, receives a timing pulse from the shaft encoder 258 (FIG. 3) to open the valve every other cycle to cause the hot water to spray against the underside of a mold strip 12 when the strip dwells at the first dwell position after the start of the filling line. It will be understood that a mold strip is positioned above the sprayer nozzles only upon every other revolution of the indexing screws 76 and 78 since it takes two cycles for a mold strip to be transferred between the mold strip spacing distance.

The wash nozzles 30 are incorporated in a smaller wash manifold 260 (FIG. 14). Wash nozzles 30 are also arranged in three rows but at closer spacings in the direction of travel of the mold strips so that they direct hot water sprays into the mold cups 12a of a single cup row of an inverted mold strip 12 (FIG. 14). The wash nozzles 30 will be understood to be transversely spaced so that they are aligned with the individual mold cups 12a. Hot water is selectively pumped to wash manifold 260 through a conduit 262 connected to the pump (not illustrated) to which the defroster manifold 250 is connected, and a solenoid operated valve 264 is installed in the conduit 262. The solenoid for valve 264 is directly connected to another switch in the control circuit so that hot water may be sprayed on each revolution of the conveyor screws while a row of inverted mold cups is directly over the wash manifold. As shall be hereinafter described, the solenoid operated valve 264 is normally set to prevent washing during regular operation of the apparatus wherein only those mold strips having missed product therein are cleaned. When it is desired to wash all mold strips, all of the mold strips are successively inverted, and the valve 264 is cyclically actuated to successively clean all of the rows of mold cups of the inverted mold strips.

The air-jet nozzles 32 comprise tubes connected in parallel relationship to a manifold 270 mounted on a support bracket 272 (FIG. 14). The air-jet nozzles are transversely spaced and inclined from the vertical so that high velocity air blasts A (FIG. 14) are directed therefrom into a row of inverted mold cups 12a. In particular, the air jets are directed upwardly along the leading end walls 90 of the mold cups to facilitate removal of the missed product MP (FIG. 14). Such product drops onto a take-away conveyor 274. High pressure air is provided to the manifold 270 through a tube 276 having a solenoid operated valve 277 therein which is also controlled by a switch in the control circuitry that receives input from the shaft encoder 258.

A stated before, turn-back cam assembly 26 is provided to automatically invert any mold strip 12 that has previously been inverted by the turn-over device 24. The cam assembly 26 operates automatically on the principle that only when a mold strip is oriented on a cradle 74 so that pin 144 is at the forward end thereof (i.e., meaning that the mold strip is inverted) will the mold strip be reinverted by the cam assembly. The cam assembly includes a rectangular plastic block 280 that is vertically mounted by a bracket 282 to side wall 66 (FIG. 15). A small block 284 (FIG. 18) is provided upstream of the block 280 to guide the pin 144 of a mold strip into a groove 286 formed in the inner surface 288 of the cam block 280. Cam groove 286 includes a horizontal inlet portion 286a that communicates with a continuous loop portion 286b adapted to cooperate with the pin 144 of an inverted mold strip to upright the strip. The cam block is cut away below a horizontal edge 287 and a straight bar 290 (FIGS. 15, 20) is horizontally mounted to block 280 contiguous with the lower edges of the inlet portion 286a. The edge 287 and bar 290 form an horizontal exit portion 286c that is aligned with the inlet portion 286a and that is adapted to guide the pin 144 onto the support rail 136 (FIG. 15). A lever 292 is freely pivotally mounted on a pin 294 between the bar 290 and cam block 280. The lever has a downstream end 296 that is relatively lighter than the upstream end 298 thereof so that the downstream end is normally tilted upwardly into the downstream exit groove portion 286c (FIG. 20). The upstream end 298 of the lever has a wedge shaped adapted to guide the pin 144 of a mold strip from the groove portion 286a upwardly into the groove portion 286b when it is tilted upwardly by the pin 144 of the preceding mold strip to block entrance into exit groove portion 286c. As shown in FIG. 18, the distance between the trailing and leading ends 296 and 298 of the lever is such that when the pin 144 of an inverted mold strip 12 is above the upstream end 298, the pin 144' of the preceding mold strip 12' will be resting on the downstream end 296 to tilt the lever so that the pin 144 will be directed upwardly into the cam groove portion 286b. As seen in FIGS. 18–20, when the pin 144 of a mold strip enters the groove portion 286b, the mold strip is inverted as its cradle 74 is carried forwardly. On the other hand, the distance between the pin 144 of two non-inverted mold strips (FIG. 20) is so great that the pin 144' of the leading mold strip will have moved off of the lever 292 by the time the pin 144 of the trailing mold is at the start of the cam groove portion 286b; thus, such pin 144 will not enter the groove portion 286b, and no inversion of the mold strip will occur.

The electronic control circuit 34 for selectively actuating the turn-over device 24 when a missed product is viewed in any of the mold cups 12a of a mold strip 12 is shown in FIG. 21. The control circuit 34 receives input signals from the photoelectric detector units 36a and 36b (FIGS. 3, 14 and 15). Referring to FIGS. 14 and 15, photodetector units 36a and 36b are aligned with the two rows of cups of a mold strip as it is transferred in the end transfer leg from the extraction land L2 back to the filling lane L1. The photodetector units each include an infrared light source and a photoelectric detector, and each unit is mounted at an angle from the vertical and at a height above the mold strip in the end transfer leg so that light is reflected from the upstream side wall 88 of each successive mold cup and then off the upper surface of any missed product back to the photoelectric detector. It is contemplated that the filler will deposit confection material into the mold cups up to approximately 3/16 inch below the top of the mold cup. The photodetector units 36a, 36b are set to generate a high output signal only when the confection material is near the upper top end of the mold cups, and, on the other hand, they will not produce an output signal when only a minor amount of confection material is deep within the mold cup. A suitable commercially available photodetector unit is the Banner Multibeam Photodetector manufactured by the Banner Engineering Corporation of Minneapolis, Minn.

Another photoelectric detector unit 302 is mounted to the end wall 60 (FIG. 15) in the vertical plane of the detectors 36a and 36b and is directed toward the mold cups to produce a signal that indicates that a mold cup is present to be tested. A further photoelectric detector unit 304 is mounted to the end wall 60 at the outer side of the filling lane L1 (FIGS. 14 and 15) to produce a signal that indicates that the mold strip has been completely transferred into the filling lane.

Referring now to FIG. 21, it will be seen that the output signals from the photodetector units 36a and 36b are fed to a NAND gate 310 so that a high signal is fed from the gate to a flip-flop 314 when missed product is sensed in either of the two cups viewed by the units 36a and 36b. The output of the photodetector unit 302 is first inverted by inverter 312 and then fed to the clock input of the flip-flop 314 so that the flip-flop passes the status of the photoelectric units 36a, 36b when the two mold cups are within the view of units 36a and 36b. The output of the flip-flop 314 is fed to a further flip-flop 316 which latches its output high when a missed product is sensed in a mold cup. The output of the latching flip-flop 316 is fed to a first register of a series of three registers 318, 320, and 322. An OR gate 324 is interposed between the latching flip-flop 316 and register 318, and such OR gate also receives a signal from the wash select switch SW-1 which, when actuated, causes the turn-over device 24 to invert all mold strips, as shall be described hereinafter.

A high signal from the photodetector unit 304, as previously stated, indicates that a mold strip scan by the photodetector units 36a, 36b and 302 is complete and that the scanned mold strip is in a position to be transferred into the mold cleaning area. The output from photodetector 304 is fed through an inverter 326 to a NAND gate 328 which squares the input signal and feeds it to the clock terminal of the first shift register 318. The clock terminals of the second and third shift register 320 and 322 are connected to the output timing signal from the shaft encoder unit 258. The timing signal is fed from the encoder unit 258 through a NAND gate 330 to the registers 320 and 322. It will be understood that the three shift registers 318, 320 and 322 delay the missed product signal from the flip-flop 316 for two encoder pulses from the time that the mold strip reaches the inlet of the feeding land L1; that is, the registers delay the missed product signal for two complete revolutions of the indexing screws 76 and 78 until the scanned mold strip with a missed product is brought into engagement with the turn-over device 24. At such point, a low signal indicative of a missed product is passed by the register 322 to the solenoid operated valve of the actuator 240 of the turn-over device 24, and the actuator will be energized to invert the mold strip. The latching flip-flop 316 is provided to hold such inverting signal until after the indexing screws have rotated through another revolution to advance the inverted strip out of the channel 154 of the turn-over device. It will be seen that the flip-flop 318 will be reset by an output signal from the second stage register 320. In turn, the flip-flop 316 is cleared by a latch reset signal provided by the register 318.

The control circuit 34 further includes means for causing the turn-over device 24 to be actuated every second cycle to invert all of the mold strips 12 so that they may be washed. This is accomplished by the wash switch SW-1 which, when actuated, provides a high signal to the OR gate 324, which signal is passed through register 318 when the end transfer photodetector unit 304 is actuated by each successive mold strip 12. Also, the wash valve 264 may then be opened every cycle to rinse the inverted mold cups one row at a time.

Having thus described a preferred embodiment of the present invention, the principle advantages of the confection producing apparatus 10 will now be summarized. First, the apparatus 10 is capable of producing frozen confections at a high rate of 30 rows of confections per minute. Such high rate of production is possible even though the freezing apparatus 11 occupies a relatively small floor area afforded by the compact rectangular conveying arrangement. Also, the freezing apparatus 11 requires a minimum number of mold strips 12 since only those five mold strips in the cleaning area and the single mold strip transferred from the extraction lane L2 to the filling lane L1 (and vice versa) are out of active use at any one time. Also, since the mold strips are returned from the extraction lane to the filling lane without necessarily being inverted, minor residual amounts of confection material left within the mold cups 12a after extraction of the confections is not wasted but is recombined with the new confection material deposited by the filler 14. Also, a minimal time elapses between extraction and filling so that such minor amounts of product remaining after extraction are not subject to any sanitation or hygiene problems. Another important advantage is that the selective mold cleaning system 22 described herein is adapted to dislodge major amounts of product such as a missed confection MP left in a moldcup when the extractor assembly 18 fails to operate or when the stick inserter 16 fails to operate properly, thus eliminating the need for an operator to inspect for and remove such missed products. Also, the present apparatus includes an efficient means for successively washing all of the mold strips at the end of a work day of when the mold strips are to be removed and a new type of mold strip inserted. Also, the preferred conveyor screw drive arrangement of the present invention is adapted to smoothly and rapidly index the mold strips without danger of brine being ejected or otherwise migrating upwardly between the detachable mold strips. Also, the conveyor so smoothly accelerates the mold strips that spill-over of the confection material from the mold cups is avoided, even though the mold cups are operated at a relatively high indexing rate and are rapidly moved through the end transfer legs. Yet another important advantage of the present inventions is that the mold strips can be quickly removed from the carriers or cradles 74, and new mold strips may be readily installed—thus minimizing the down-time of the apparatus when it is desired to set up the apparatus to manufacture a different type of frozen confection.

Although the best mode contemplated for carrying out the present invention has been herein shown and described, it will be apparent that modification and variation may be made without departing for what is regarded to be the subject matter of the invention.

What is claimed is:

1. An apparatus for producing frozen confections comprising: a frame, a plurality of carriers, a plurailty of molds for receiving confection material individually mounted upon said carriers, slide tracks mounted to said frame and extending in a rectangular arrangement for slidably guiding the carriers for movement through a rectagular path in a horizontal plane, a plurality of conveyor screws mounted in a rectangular relationship parallel to said slide tracks for propelling the carriers along said rectangular path, means for rotating said conveyor screws in timed relation to each other, and means located below portions of said rectangular path of travel for cooling the molds to freezing temperatures, whereby confection material deposited in the molds may be frozen as the molds are carried through said rectangular path.

2. The apparatus for producing frozen confections according to claim 1 wherein said means for rotating said conveyor screws is adapted to continuously rotate said conveyor screws, said conveyor screws having continuous screw threads formed therein with dwell portions adapted to cause the carriers to move intermittently, whereby confection material may be deposited into the molds while the molds are dwelling and whereby frozen confection material may be removed from the molds while the molds are dwelling.

3. An apparatus for producing frozen confections coomprising: a plurality of mold members, each mold member having a plurality of mold cups arranged in a linear pattern, cradles for individually supporting the mold members so that the mold cups normally face upwardly and so that the mold members may be inverted, means for conveying the cradles in a closed path with the mold cups facing upwardly, means for successively depositing confection material into the mold cups of the mold members, means underlying a portion of said closed path for freezing the confection material in the mold cups to thereby form frozen confections, means downstream of said depositing means for inserting sticks into the confection material within the mold cups, means downstream from said freezing means for engaging the sticks of frozen confections and for extracting said frozen confections, means upstream of said depositing means and downstream from said extracting means for detecting whether confection material has been left in any mold cup of a mold member after the mold member passes said extracting means, means responsive to said detecting means for selectively inverting a mold member determined to have confection material left therein, means for removing the confection material detected within the mold member after the mold member has been inverted, and means for pivoting the inverted mold member back to its normal position on the associated cradle after the detected confection material has been removed.

4. An apparatus for producing frozen confections comprising: a plurality of separate elongate mold members, each mold member including at least one row of confection receiving mold cups and conveyor means for intermittently conveying the mold strips along a path; the improvement wherein said conveyor means includes first primary conveyor means for detachably mounting and intermittently conveying said mold members in a first single file with the rows of mold cups extending transversely of their direction of travel, second primary conveyor means for detachably mounting and intermittently conveying mold members in a second single file with the rows of mold cups extending transversely at their direction of travel, the mold members in said second conveyor means being laterally adjacent to those of said first primary conveyor means and having a direction of travel that is opposite to and parallel to the direction of travel of the mold members in said first primary conveyor means, said first and second primary conveyor means having the same velocity; first transfer conveyor means for successively detaching and laterally transferring the downstream mold member from the first primary conveyor means to the upstream end of the second primary conveyor means, second transfer conveyor means for successively detaching and laterally transferring the downstream mold member of the second primary conveyor means to the upstream end of the first primary conveyor means, means for operating said primary conveyor means, means for operating said transfer conveyor means independently of said primary conveyor means, and means positioned under mold members of both said first and second primary conveyor means for freezing confections in associated mold cups.

5. The apparatus of claim 4 wherein said means for operating the transfer conveyor means operates the same at a higher velocity than the means for operating the primary conveyor means operates the latter.

6. Apparatus for producing frozen confection comprising a plurality of separate elongate mold members, each mold member including at least one row of mold cups for respectively receiving confection material to be frozen and conveyor means for conveying the mold members through a selected path; first the improvement comprising first conveyor means for conveying mold members in a first single file with the mold cups extending transversely of their direction of travel, second conveyor means for conveying mold members in a separate second single file that is parallel to said first single file and in a direction of travel that is opposite to that of the mold members in said first single file, means for laterally transferring the downstream mold member in the first single file to the upstream end of the second single file in timed relation to the movement of the mold members in said two files, and means for laterally transferring the downstream mold member of the second single file to the upstream end of the first single file also in timed relation to the intermittent movements of the mold members in said files, filling means located above said first conveyor means for successively depositing confection material in the rows of mold cups of the mold members with confections, means positioned along said first conveyor means and downstream of said filling means for partially freezing the confections, means along said first conveyor means and downstream of said partial freezing means for inserting sticks into the partially frozen confections, means along an upstream portion of said second conveyor means for completely freezing the confections and extractor means along said second conveyor means downstream of said complete freezing means for successively removing the frozen confections from the rows of mold cups.

7. The apparatus for producing frozen confections according to claim 6 wherein said conveyor means comprises a plurality of carriers, means for individually mounting said mold members upon said carriers, a first pair of parallel conveyor screws for conveying said carriers along one of the files, a second pair of parallel conveyor screws for conveying the carriers along the other file, and common drive means for rotating said pairs of screws to move the carriers in said two files in synchronous relationships and in opposite directions.

8. The apparatus for producing frozen confections according to claim 6 wherein said conveying means includes a plurality of carriers, means for moving said carriers through said path, and means for detachably connecting said mold members to said carriers.

9. The apparatus for producing frozen confections according to claim 6 wherein said conveyor means includes a plurality of carriers and means for pivotally connecting said mold members to said carriers so that each mold member may be pivoted about an axis extending longitudinally of the mold member, said apparatus further comprising means positioned along said path between said frozen confection removing means and said filling means for pivoting a mold member about its axis of rotation into an inverted position such that the mold cups thereof face downwardly, means for dislodging any confection material that may be present within an inverted mold member, and means upstream from said confection filling means for pivoting an inverted mold member back to its original orientation so that further confection material may be deposited therein.

10. An apparatus for producing frozen confections comprising: a plurality of separate elongate mold strips, each strip including at least one row of mold cups extending lengthwise of the strip for receiving confection material, conveyor means for conveying the mold strips along a path of travel with the mold cups normally opening upwardly, filler means along said path for successively depositing confection material into the cups of the mold strips, means for freezing the material and extractor means positioned along said path for successively removing frozen confections from the mold strips; the improvement comprising means for invertably mounting said mold strips on said conveyor means, means positioned along said path between said extractor means and said filler means for inverting a mold strip so that the mold cups open downwardly, means for cleaning confection material from the inverted mold cups, and means for restoring the inverted mold strip to its normal position with the cups opening upward before the strip arrives at said filler means.

11. The apparatus for producing frozen confections according to claim 10 further comprising a first end transfer conveyor screw extending transversely of said pairs of conveyor screws at the ends thereof for transferring a carrier transversely from engagement with one pair of said conveyor screws into engagement with the other pair of conveyor screws, and a second end transfer conveyor screw located at the opposite ends of the pairs of conveyor screws for conveying a carrier from engagement with said other pair of conveyor screws to engagement with said one pair of conveyor screws, and means for rotating said end transfer screws in timed relation to the rotation of said two pairs of conveyor screws.

12. The apparatus for producing frozen confections according to either claim 10 wherein said conveyer screws each includes grooves formed in the perimeter thereof, each carrier includes a pair of transversely spaced members adapted to be received in the grooves in each of said pairs of indexing screws, said common drive means being adapted to continuously drive said screws, and said grooves being adapted to cause said carriers to intermittently dwell at preselected locations along said path of travel.

13. The apparatus according to claim 10 further comprising detecting means positioned along said path downstream from said extractor means and upstream from said inverting means for detecting confection material within any mold cup of a mold strip, and control means responsive to said detecting means for inverting only those mold strips within which confection material is detected.

14. The apparatus according to claim 13 wherein said endless path is a rectangular path having transfer legs for moving the mold strips lengthwise with the row of mold cups thereof being aligned with its direction of travel and said detecting means being located above a transfer leg of the rectangular path of travel, said detecting means including photo-detector means for successively viewing the cups in each row of cups moving along said transfer leg.

15. An apparatus for producing frozen confections comprising: a plurality of separate elongate mold members, each mold member including at least one row of mold cups for respectively receiving confection material to be frozen; the improvement comprising means for conveying the mold members in a closed rectangular travel path having adjacent parallel legs with the mold members extending transversely of their direction of travel along said parallel legs and with the mold cups opening upwardly, filling means above one of said parallel legs for successively depositing confection material into the mold cups of a row of mold cups, extractor means above the other one of said parallel legs for successively removing the frozen confections within a row of mold cups, and freezing means disposed under portions of both of said legs between said depositing means and said removing means for freezing the confection material deposited in the mold cups.

16. Apparatus for producing molded confections comprising a plurality of elongate, multi-cup mold members, first primary conveyor means for detachably mounting and conveying a number of said mold members in one direction from a mold receiving end to a mold delivery end, second primary conveyor means for detachably mounting and conveying the same number of said mold members in the opposite direction from a mold receiving end to a mold delivery end, said first and second primary conveyor means conveying said elongate mold members in a position wherein they are disposed transversely to their paths of travel, first transfer conveyor means for successively detaching individual mold members from the delivery end of said first primary conveyor means and transferring the mold members to the receiving end of said second primary conveyor means, second transfer conveyor means for successively detaching individual mold members from the delivery end of said second primary conveyor means and transferring the mold members to the receiving end of said first primary conveyor means, means for operating said primary conveyor means and means for independently operating said transfer conveyor means.

17. The apparatus for producing frozen confections according to either claim 16 further comprising means positioned along said path of travel downstream of said removing means for detecting whether any confection material is left within a mold cup of a mold member after the mold member passes under said removing means, said means for pivoting a mold strip into an inverted position being responsive to said detecting means to invert only those mold members that have confection material in a mold cup thereof.

18. The apparatus of claim 16 comprising mold cup filler means disposed along an upstream portion of said first primary conveyor means, means disposed along said first primary conveyor means and downstream of said filler means for partially freezing the confections, means disposed along said first primary conveyor means and downstream of said partial freezing means for inserting sticks into the partially frozen confections; means disposed along an upstream portion of said second primary conveyor means for completely freezing the confections and means disposed along said second primary conveyor means downstream of said complete freezing means for extracting frozen confections from said mold cups.

* * * * *